(12) United States Patent
Takebe et al.

(10) Patent No.: US 9,081,133 B2
(45) Date of Patent: *Jul. 14, 2015

(54) POLARIZING PLATE PROTECTIVE FILM, POLARIZING PLATE, AND LIQUID CRYSTAL DISPLAY

(71) Applicant: KONICA MINOLTA, INC., Tokyo (JP)

(72) Inventors: Takashi Takebe, Kanagawa (JP); Kunio Shimizu, Yamanashi (JP); Shigeki Oka, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/504,729

(22) Filed: Oct. 2, 2014

(65) Prior Publication Data

US 2015/0015951 A1    Jan. 15, 2015

Related U.S. Application Data

(63) Continuation of application No. 12/305,213, filed as application No. PCT/JP2007/061718 on Jun. 11, 2007, now Pat. No. 8,900,676.

(30) Foreign Application Priority Data

Jun. 21, 2006   (JP) .................................. 2006-171167

(51) Int. Cl.
*G02F 1/1335*   (2006.01)
*G02B 1/10*   (2015.01)
*G02B 5/30*   (2006.01)
*G02B 1/08*   (2006.01)

(52) U.S. Cl.
CPC   *G02B 1/105* (2013.01); *G02B 1/08* (2013.01); *G02B 5/305* (2013.01); *G02B 5/3083* (2013.01); *G02F 1/133528* (2013.01); *G02F 2201/50* (2013.01); *Y10T 428/105* (2015.01)

(58) Field of Classification Search
CPC .......... G02B 1/08; G02B 1/105; G02B 5/305; G02B 5/3083; G02F 1/133528; G02F 2201/50; Y10T 428/105
USPC .................... 428/1.3–1.33, 1.54; 349/96, 122
See application file for complete search history.

(56) References Cited

U.S. PATENT DOCUMENTS

| | | | |
|---|---|---|---|
| 2,689,799 A | 9/1954 | Albus et al. | |
| 7,755,726 B2 | 7/2010 | Sasada | |
| 8,416,369 B2 | 4/2013 | Oka | |
| 8,580,358 B2 | 11/2013 | Takebe et al. | |
| 8,900,676 B2 * | 12/2014 | Takebe et al. | 428/1.33 |
| 2002/0041352 A1 | 4/2002 | Kuzuhara et al. | |
| 2002/0102369 A1 | 8/2002 | Shimizu et al. | |
| 2004/0247889 A1 | 12/2004 | Nakajima et al. | |
| 2005/0208231 A1 | 9/2005 | Nimura et al. | |
| 2007/0048462 A1 | 3/2007 | Takebe et al. | |
| 2008/0102262 A1 | 5/2008 | Esaki | |

FOREIGN PATENT DOCUMENTS

| | | | |
|---|---|---|---|
| JP | 2002-363420 | 12/2002 | |
| JP | 2004-271846 | 9/2004 | |
| JP | 2004271846 A | * 9/2004 | ............... G02B 5/30 |
| JP | 2006-117914 | 5/2006 | |
| JP | 2006-137909 | 6/2006 | |
| JP | 2006-146165 | 6/2006 | |
| WO | 2006/049296 | 5/2006 | |

OTHER PUBLICATIONS

Korean Office Action, Notice of Submission of Opinion, Application No. 10-2014-7017908, mailing date: Sep. 24, 2014, and English translation thereof (total of 7 pages).
Japanese Office Action, Application No. 10-2008-7030772, mailing date Jul. 26, 2013 (4 pages).
English translation of Japanese Office Action, Application No. 10-2008-7030772, mailing date Jul. 26, 2013 (4 pages).
JPO Website Machine English Translation of JP 2006-039024, Masayuki et al, Feb. 9, 2006.
JPO Website Machine English Translation of JP-2005-120352, Sasada et al, May 12, 2005.
JPO Website Machine English Translation of JP 2006-117914, Haruta et al., May 11, 2006.

* cited by examiner

*Primary Examiner* — Sophie Hon
(74) *Attorney, Agent, or Firm* — Lucas & Mercanti, LLP

(57) ABSTRACT

A polarizing plate protective film forming a polarizing plate by sandwiching a polarizer with two of the polarizing plate protective films, wherein at least one of the two polarizing plate protective films exhibits Ro defined by Expression (I) of 0 to 10 mm and Rt defined by Expression (II) of −20 to 20 mm, and also at least one of the polarizing plate protective films has a hard coat layer: Expression (I): Ro=(nx−ny)×d; Expression (II): Rt={(nx+ny)/2−nz}×d; wherein nx is a refractive index in a delayed phase axis direction in a plane of the polarizing plate protective film, ny is a refractive index in a direction at right angles to the delayed phase axis in the plane, nz is a refractive index in a film thickness direction, and d is a film thickness (nm).

6 Claims, No Drawings

POLARIZING PLATE PROTECTIVE FILM, POLARIZING PLATE, AND LIQUID CRYSTAL DISPLAY

This is a Continuation of U.S. application Ser. No. 12/305,213 filed on Dec. 17, 2008, which was a U.S. National Phase Application under 35 U.S.C. 371 of International Application PCT/JP2007/061718 filed on Jun. 11, 2007, which claimed the priority of Japanese Application No. 2006-171167 filed on Jun. 21, 2006, the entire content of these Applications are hereby incorporated by reference.

TECHNICAL FIELD

The present invention relates to a polarizing plate protective film, a polarizing plate, and a liquid crystal display, and specifically to a polarizing plate protective film exhibiting minimal retardation value variation, and excellent stability with respect to polarizer deterioration, polarizing plate dimensions, and polarizing plate curling.

BACKGROUND

With realization of higher performance and higher quality of liquid crystal displays, as polarizing plate protective films used for polarizing plates, there are being sought polarizing plate protective films exhibiting long-term durability of polarizers under high temperature and high humidity conditions, and exhibiting performance to endure severe ambient variation against dimensional stability and curling properties of the polarizing plates.

Long-term resistance to heat due to backlighting is required specifically for a polarizing plate adjacent to the backlight. Recently, to increase light efficiency of the backlight, a liquid crystal display has been designed so that a luminance enhancing film is sandwiched between the backlight and the liquid crystal cell. However, light, having passed though this luminance enhancing film, is frequently polarized. Accordingly, with regard to the polarizing plate protective film, a film has been demanded to be designed so that no birefringence is expressed by heat resulting from the backlight.

Currently, a film employing a cellulose ester as a material is commonly used for a polarizing plate protective film of a liquid crystal display. A solution casting film forming method is commonly used to produce a cellulose ester film from the viewpoint of ensuring flatness. Such a film tends to expand in the film thickness direction as a solvent evaporates, whereby the refractive index in the thickness direction is smaller than that of the film in-plane direction. In addition thereto, as a result of taking into account the display mode of a liquid crystal display and retardation of another retardation film or member, in order to ensure a specific viewing angle of the liquid crystal display, there have been sought a film, as an optimal polarizer protective film, featuring the same refractive index both in the thickness and the in-plane directions, and further a polarizing plate protective film featuring a relatively high refractive index in the in-plane direction.

Patent Document 1 discloses that via addition of an ethylenic polymer, there is obtained a film exhibiting minimal deterioration of a polarizer under high temperature and high humidity conditions, as well as exhibiting minimal retardation in the thickness direction. However, it became clear that the level of durability, having been currently required, of the polarizer under high temperature and high humidity conditions could not be realized only by adding an ethylenic polymer. In addition, it became clear that as more ethylenic polymer was introduced in order to reduce retardation, the polarizer tended to be deteriorated more severely.

Patent Document 1: Unexamined Japanese Patent Application Publication No. (hereinafter referred to as JP-A) 2003-12859

DISCLOSURE OF THE INVENTION

Problems to be Solved by the Invention

An object of the present invention is to provide a polarizing plate protective film exhibiting minimal retardation value variation, and excellent stability with respect to polarizer deterioration, polarizing plate dimensions, and polarizing plate curling.

Means to Solve the Problems

The above problems of the present invention can be solved via the following constitutions:

Item 1. A polarizing plate protective film forming a polarizing plate by sandwiching a polarizer with two of the polarizing plate protective films, wherein at least one of the two polarizing plate protective films exhibits Ro defined by Expression (I) of 0 to 10 nm and Rt defined by Expression (II) of −20 to 20 nm, and also at least one of the polarizing plate protective films has a hard coat layer:

$$Ro = (nx-ny) \times d \quad \text{Expression (I):}$$

$$Rt = \{(nx+ny)/2-nz\} \times d \quad \text{Expression (II):}$$

wherein nx is a refractive index in a delayed phase axis direction in a plane of the polarizing plate protective film, ny is a refractive index in a direction at right angles to the delayed phase axis in the plane, nz is a refractive index in a film thickness direction, and d is a film thickness (nm).

Item 2. The polarizing plate protective film described in item 1 above, wherein the polarizing plate protective film having the hard coat layer is a cellulose ester film containing polymer X of a weight average molecular weight of 5000-30000 obtained via copolymerization of ethylenically unsaturated monomer Xa having neither an aromatic ring nor a hydrophilic group in the molecule, and ethylenically unsaturated monomer Xb having no aromatic ring but having a hydrophilic group in the molecule.

Item 3. The polarizing plate protective film described in item 1 or 2 above, wherein the polarizing plate protective film having a hard coat layer is a cellulose ester film containing polymer X of a weight average molecular weight of 5000-30000 obtained via copolymerization of ethylenically unsaturated monomer Xa having neither an aromatic ring nor a hydrophilic group in the molecule, and ethylenically unsaturated monomer Xb having no aromatic ring but having a hydrophilic group in the molecule, as well as polymer Y of a weight average molecular weight of 500-3000 obtained via polymerization of ethylenically unsaturated monomer Ya having no aromatic ring.

Item 4. The polarizing plate protective film described in any one of items 1-3 above, wherein polymer X is represented by Formula (1) and polymer Y is represented by Formula (2):

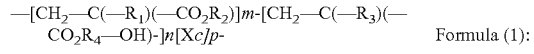

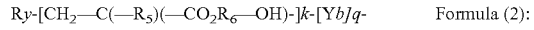

wherein $R_1$, $R_3$, and $R_5$ are H or $CH_3$, $R_2$ is an alkyl group of a carbon number of 1-12 or a cycloalkyl group, $R_4$ and $R_6$ are —$CH_2$—, —$C_2H_4$—, or —$C_3H_6$—, Ry is OH, H, or an alkyl group of a carbon number of at most 3, Xc is a monomer unit polymerizable with Xa or Xb, Yb is a monomer unit copolymerizable with Ya; and m, n, k, p, and q are molar composition ratios wherein m≠0, n≠0, k≠0, m+n+p=100, and k+q≤100.

Item 5. The polarizing plate protective film described in item 4 above,
wherein the polarizing plate protective film having a hard coat layer is a cellulose ester film containing at least polymer X and a polyester represented by Formula (3) or (4):

$B_1$-(G-A-)wG-$B_1$    Formula (3):

wherein $B_1$ is a monocarboxylic acid, G is a dihydric alcohol, A is a dibasic acid; $B_1$, G and A each contain no aromatic ring, w is a repetition number, and a plurality of $B_1$ and G may be the same or different:

$B_2$-(A-G-)zA-$B_2$    Formula (4):

wherein $B_2$ is a monohydric alcohol, G is a dihydric alcohol, A is a dibasic acid; $B_2$, G, and A each contain no aromatic ring, z is a repetition number, and a plurality of $B_2$ and G may be the same or different.

Item 6. The polarizing plate protective film described in any one of items 1-5 above, wherein the thickness of the hard coat layer is 1-30 μm.

Item 7. A polarizing plate, wherein the polarizing plate protective film described in item 6 is bonded to at least one side of a polarizer.

Item 8. A liquid crystal display, wherein the polarizing plate described in item 7 is used.

Effects of the Invention

According to the present invention, there were realized a polarizing plate protective film, a polarizing plate, and a liquid crystal display exhibiting minimal retardation value variation, as well as exhibiting excellent stability with respect to polarizer deterioration, polarizing plate dimensions, and polarizing plate curling.

BEST MODE TO CARRY OUT THE INVENTION

The best mode to carry out the present invention will now be detailed. However, the present invention is not limited thereto.

The polarizing plate protective film of the present invention is characterized by exhibiting retardation values Ro of 0-10 nm and Rt of −20-20 nm, and by having a hard coat layer.

As methods of controlling Ro and Rt of the present invention, various methods are known, any of which is employable. However, from the viewpoint of transparency, preferable is a cellulose ester film containing polymer X of a weight average molecular weight of 5000-30000 obtained via copolymerization of ethylenically unsaturated monomer Xa having neither an aromatic ring nor a hydrophilic group in the molecule with ethylenically unsaturated monomer Xb having no aromatic ring but having a hydrophilic group in the molecule, and preferably also containing polymer Y of a weight average molecular weight of 500-3000 obtained via polymerization of ethylenically unsaturated monomer Ya having no aromatic ring.

<Polymer X and Polymer Y>

It has been well known that a substance having an aromatic ring in a monomer, specifically in its main chain commonly exhibits positive birefringence similarly to birefringence of a cellulose ester. Since such a substance does not counteract the retardation value Rt of a cellulose ester film, it is preferable to add a material having negative birefringence into the film.

Polymer X of the present invention is a polymer of a weight average molecular weight of 5000-30000 obtained via copolymerization of ethylenically unsaturated monomer Xa having neither an aromatic ring nor a hydrophilic group in the molecule with ethylenically unsaturated monomer Xb having no aromatic ring but having a hydrophilic group in the molecule, and is preferably a polymer represented by following Formula (1):

—[$CH_2$—C(—$R_1$)(—$CO_2R_2$)]m-[$CH_2$—C(—$R_3$)(—$CO_2R_4$—OH)-]n-[Xc]p-    Formula (1):

wherein $R_1$ and $R_3$ represent H or $CH_3$; $R_2$ represents an alkyl group of a carbon number of 1-12 or a cycloalkyl group; $R_4$ represents —$CH_2$—, —$C_2H_4$—, or —$C_3H_6$—; Ry represents OH, H, or an alkyl group of a carbon number of at most 3; Xc represents a monomer unit polymerizable with Xa or Xb; m, n, and p represent molar composition ratios wherein m≠0, n≠0, m+n+p=100.

Monomers as a monomer unit constituting polymer X of the present invention will now be listed with no limitation.

In X, the hydrophilic group is a group having a hydroxyl group or an ethylene oxide chain.

Ethylenically unsaturated monomer Xa having neither an aromatic ring nor a hydrophilic group in the molecule includes, for example, methyl acrylate, ethyl acrylate, propyl (i- and n-) acrylate, butyl (n-, s-, and t-) acrylate, pentyl (n-, i-, and s-) acrylate, hexyl (n- and i-) acrylate, heptyl (n- and i-) acrylate, octyl (n- and i-) acrylate, nonyl (n- and i-) acrylate, myristyl (n- and i-) acrylate, 2-ethylhexyl acrylate, ε-caprolactone acrylate, 2-hydroxyethyl acrylate, and 2-ethoxyethyl acrylate, or those wherein the above acrylic acid esters are replaced with methacrylic acid esters. Of these, preferable are methyl acrylate, ethyl acrylate, methyl methacrylate, ethyl methacrylate, and propyl (i- and n-) methacrylate.

Ethylenically unsaturated monomer Xb having no aromatic ring but having a hydrophilic group in the molecule is preferably an acrylic acid ester or a methacrylic acid ester as a monomer unit having a hydroxyl group, including, for example, 2-hydroxyethyl acrylate, 2-hydroxypropyl acrylate, 3-hydroxypropyl acrylate, 4-hydroxybutyl acrylate, and hydroxybutyl acrylate, or those wherein the above acrylic acid is replaced with methacrylic acid. Of these, 2-hydroxyethyl acrylate, 2 hydroxyethyl methacrylate, 2-hydroxypropyl acrylate, and 3-hydroxypropyl acrylate are preferable.

Xc is not specifically limited provided that Xc is an ethylenically unsaturated monomer other than Xa or Xb and also is copolymerizable, but preferably has no aromatic ring.

The molar composition ratio m n of Xa to Xb is preferably in the range of 99:1-65:35, more preferably 95:5-75:25. The molar composition ratio of Xc is 0-10. Xc may be plural monomer units.

When the molar composition ratio of Xa is relatively large, compatibility with a cellulose ester becomes better but retardation value Rt in the film thickness direction increases. When the molar composition ratio of Xb is relatively large, the above compatibility becomes worse but a large effect to reduce Pt is expressed. Further, when the molar composition ratio of Xb exceeds the above range, haze tends to occur during film formation. It is preferable to determine the molar composition ratios of Xa and Xb by optimizing these conditions.

In synthesis of these polymers, molecular weight control is difficult in common polymerization. Therefore, it is preferable to employ a method which enables molecular weights to be as uniform as possible in such a manner that the molecular weights do not become excessively large. Such a method includes a method of using a peroxide polymerization initiator such as cumene peroxide or t-butyl hydroperoxide, a method of using a large amount of a polymerization initiator compared to common polymerization, a method of using a chain transfer agent such as a mercapto compound or a carbon tetrachloride in addition to a polymerization initiator, a method of using a polymerization terminating agent such as benzo quinone or dinitrobenzene in addition to a polymerization initiator, and further a method of carrying out bulk polymerization by use of a compound having one thiol group and secondary hydroxyl group, or by use of a polymerization catalyst prepared in combination of the compound with an organic metal compound, as disclosed in Unexamined Japanese Patent Application Publication (hereinafter referred to as JP A) Nos. 2000-128911 and 2000-344823. In the present invention, any of these is preferably used, and specifically any of the methods described in the above patent publications is preferable.

The hydroxyl group value of polymer X is preferably 30-150 mgKOH/g.

(Determination Method of Hydroxyl Group Value)

This determination is based on JIS K 0070 (1992). The hydroxyl group value is defined as the number of milligrams of potassium hydroxide required to neutralize acetic acid joining a hydroxyl group when 1 g of a sample is acetylated. Specifically, X g (approximately 1 g) of the sample is precisely weighed in a flask, and thereto, an acetylating reagent (a reagent in which pyridine is added to 20 ml of acetic anhydride to get a mixture of 400 ml) is accurately added. An air cooling tube is attached to the mouth of the flask, followed by heating in a glycerin bath of 95-100° C. After one and a half hours of heating, cooling is carried out, and 1 ml of purified water is added through the air cooling tube to decompose the acetic anhydride into acetic acid. Subsequently, titration is conducted with a 0.5 mol/l potassium hydroxide ethanol solution using a potential difference titration apparatus. The inflection point of the thus-obtained titration curve is defined as an end point. Further, as a blank test, titration is carried out with no sample to determine the inflection point of the titration curve. The hydroxyl group value is calculated by the following expression:

Hydroxyl group value=$\{(B-C) \times f \times 28.05/X\}+D$ where B represents the amount (ml) of a 0.5 mol/l potassium hydroxide ethanol solution used in a blank test; C represents the amount (ml) of the 0.5 mol/l potassium hydroxide ethanol solution used in the titration; f represents the factor of the 0.5 mol/l potassium hydroxide ethanol solution; D represents an acid value; and 28.05 represents a half of the amount of 1 mol, 56.11, of potassium hydroxide.

The molecular weight of polymer X is preferably 5000-30000, more preferably 8000-25000, in terms of weight average molecular weight.

This weight average molecular weight is preferably at least 5000, whereby there can be obtained such benefits that dimensional variation of a cellulose ester film under high temperature and high humidity conditions are minimized and minimal curling is realized with respect to a polarizing plate protective film. When the weight average molecular weight is at most 30000, compatibility with a cellulose ester is further enhanced. Then bleeding out under high temperature and high humidity conditions and also haze occurrence immediately after film formation are inhibited.

The weight average molecular weight of polymer X of the present invention can be controlled via any appropriate molecular weight adjusting method known in the art. Such a molecular weight adjusting method includes, for example, a method of adding a chain transfer agent such as carbon tetrachloride, lauryl mercaptan, or octyl thioglycolate. Further, the polymerization temperature is commonly room temperature—130° C., preferably 50° C.-100° C. For realization, the temperature or polymerization reaction duration is controlled.

A determination method of a weight average molecular weight can be conducted via the following method.

(Weight Average Molecular Weight Determination Method)

Determination of a weight average molecular weight is carried out via high-performance liquid chromatography.

Determination conditions are as follows.

Solvent: Methylene chloride

Column: Shodex K806, K805, and K803G (These three columns produced by Showa Denko K. K. were connected for this use.)

Column temperature: 25° C.

Sample concentration: 0.1 by weight

Detector: RI Model 504 (produced by GL Sciences Inc.)

Pump: L6000 (produced by Hitachi, Ltd.)

Flow rate: 1.0 ml/minute

Calibration curve: A calibration curve, based on 13 samples of Standard Polystyrene STK, standard polystyrene (produced by Tosoh Corp.) featuring a molecular weight of 1000000-500, was used. The 13 samples are used at nearly even intervals.

Polymer Y of the present invention is a polymer of a weight average molecular weight of 500-3000 obtained via polymerization of ethylenically unsaturated monomer Ya having no aromatic ring, and is preferably a polymer represented by Formula (2) described below.

The weight average molecular weight is preferably at least 500, since the amount of a residual monomer in the polymer is reduced. Further, it is preferable to be at most 3000 in order to maintain performance of reducing retardation value Rt.

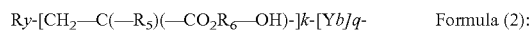

$R_y$-[$CH_2$—C(—$R_5$)(—$CO_2R_6$—OH)-]$k$-[$Yb$]$q$-    Formula (2):

wherein $R_5$ represents H or $CH_3$; $R_6$ represents —$CH_2$—, —$C_2H_4$—, or —$C_3H_5$—; Ry represents OH, H, or an alkyl group of a carbon number of at most 3; Yb represents a monomer unit copolymerizable with Ya; and k and q represent molar composition ratios wherein k≠0 and k+q=100.

Ethylenically unsaturated monomer Ya constituting polymer Y obtained via polymerization of an ethylenically unsaturated monomer having no aromatic ring includes, as an acrylic acid ester, for example, methyl acrylate, ethyl acrylate, propyl (i- and n-) acrylate, butyl (n-, i-, s-, and t-) acrylate, pentyl n-, i-, and s-) acrylate, hexyl (n- and i-) acrylate, heptyl (n- and i-) acrylate, octyl (n- and i-) acrylate, nonyl (n- and i-) acrylate, myristyl (n- and i-) acrylate, cyclohexyl acrylate, 2-ethylhexyl acrylate, ε-caprolactone acrylate, 2-hydroxyethyl acrylate, 2-hydroxypropyl acrylate, 3-hydroxypropyl acrylate, 4-hydroxybutyl acrylate, and 2-hydroxybutyl acrylate; as a methacrylic acid ester, those wherein the above acrylic acid esters are replaced with methacrylic acid esters; and, as an unsaturated acid, for example, acrylic acid, methacrylic acid, maleic anhydride, crotonic acid, and itaconic acid.

Yb is not specifically limited provided that Yb is an ethylenically unsaturated monomer copolymerizable with Ya. As a vinyl ester, there are preferable, for example, vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octylate, vinyl methacrylate, vinyl crotonate, vinyl sorbate, and vinyl cinnamate. Yb may be plural, and k+q+100 and q is 0-30.

Polymer X and polymer Y, described above, each exhibit excellent compatibility with a cellulose ester, excellent productivity with no evaporation or volatilization, and thereby, there are expressed enhanced retention properties for a polarizing plate protective film, as well as minimal moisture permeability and excellent dimensional stability.

The contents of polymer X and polymer Y in a cellulose ester film are preferably in the range satisfying following Expressions (i) and (ii). When the content of polymer X is Xg (% by mass=mass of polymer X/mass of cellulose ester×100) and the content of polymer Y is Yg by mass), the following expressions are satisfied:

$$5 \leq Xg+Yg \leq 35 (\% \text{ by mass})$$ Expression (i):

$$0.05 \leq Yg/(Xg+Yg) \leq 0.4$$ Expression (ii):

The preferable range in Expression (i) is 10-25% by mass.

Polymer X and polymer Y of a total amount of at least 5% by mass adequately function to reduce retardation value Rt. Further, when the total amount is at most 35% by mass, adhesion to a polarizer of PVC is enhanced.

It is possible that polymer X and polymer Y are directly added and dissolved as materials constituting a dope liquid to be described later, or are added in the dope liquid after previous dissolution in an organic solvent dissolving a cellulose ester.

[Polyesters]
(Polyesters Represented by Formula (3) or (4))

The cellulose ester film of the present invention preferably contains a polyester represented by following Formula (3) or (4):

$$B_1\text{-}(G\text{-}A\text{-})wG\text{-}B_1$$ Formula (3):

wherein $B_2$ represents a monocarboxylic acid; G represents a dihydric alcohol; A represents a dibasic acid; $B_1$, G, and A each contain no aromatic ring; w represents a repetition number; and a plurality of $B_1$ and G may be the same or different $$B_2\text{-}(A\text{-}G\text{-})zA\text{-}B_2$$ Formula (4):

wherein $B_2$ represents a monohydric alcohol; G represents a dihydric alcohol; A represents a dibasic acid; $B_2$, G and, A each contain no aromatic ring; z represents a repetition number; and a plurality of $B_2$ and G may be the same or different.

As the monocarboxylic acid represented by $B_1$, any appropriate aliphatic monocarboxylic acid and alicyclic monocarboxylic acid can be used with no specific limitation.

Examples of preferable monocarboxylic acids can be listed below that by no means limit the scope of the present invention.

As aliphatic monocarboxylic acids, straight-chained or branched fatty acids of a carbon number of 1-32 are preferably used. However, it is more preferable for the carbon number to be 1-20, specifically preferable to be 1-12. Acetic acid is preferably contained to enhance compatibility with a cellulose ester, and further it is preferable to use acetic acid by mixing with another monocarboxylic acid.

Preferable aliphatic monocarboxylic acids include saturated fatty acids such as formic acid, acetic acid, propionic acid, butyric acid, valeric acid, caproic acid, enanthic acid, caprylic acid, pelargonic acid, caprin acid, ethyl-hexane carboxylic acid, undecylic acid, lauric acid, tridecyl acid, myristic acid, pentadecyl acid, palmitic acid, heptadecyl acid, stearic acid, nonadecane acid, arachic acid, behenic acid, lignoceric acid, cerotic acid, heptacosanic acid, montanic acid, melissic acid, or lacceric acid; and unsaturated fatty acids such as undecylenic acid, oleic acid, sorbic acid, linoleic acid, linolenic acid, or arachidonic acid.

As the monohydric alcohol component represented by $B_2$, any appropriate alcohol can be used with no specific limitation. For example, straight-chained or branched aliphatic saturated alcohols or aliphatic unsaturated alcohols having a carbon number of 1-32 are preferably used. It is more preferable for the carbon number to be 1-20, specifically preferable to be 1-12.

The dihydric alcohol component represented by G includes those listed below that by no means limit the scope of the present invention. For example, listed are such as, ethylene glycol, diethylene glycol, 1,2-propylene glycol, 1,3 propylene glycol, 1,2-butylene glycol, 1,3-butylene glycol, 1,4-butylene glycol, 1,5-pentane diol, 1,6-hexane diol, 1,5-pentylene glycol, diethylene glycol, triethylene glycol, and tetraethylene glycol. Of these, ethylene glycol, 1,2-propylene glycol, 1,3-propylene glycol, 1,2-butylene glycol, 1,3-butylene glycol, 1,4-butylene glycol, 1,6-hexane diol, diethylene glycol, and triethylene glycol. Further, more preferably used are 1,3-propylene glycol, 1,4-butylene glycol, 1,8-hexane diol, and diethylene glycol.

As the dibasic acid (dicarboxylic acid) represented by A, an aliphatic dibasic acid and an alicyclic dibasic acid are preferable. For example, as the aliphatic dibasic acid, there are used malonic acid, succinic acid, glutaric acid, adipic acid, pimelic acid, suberic acid, azelaic acid, sebacic acid, undecane dicarboxylic acid, and dodecane dicarboxylic acid. Especially, aliphatic dicarboxylic acids having a carbon atom number of 4-12 are used. At least one type selected therefrom is used. Namely, dibasic acids of at least 2 types may be used in combination.

The symbols w and z represent repetition numbers, which are preferably 1-170.

The weight average molecular weight of a polyester is preferably at most 20000, more preferably at most 10000. Especially, a polyester featuring a weight average molecular weight of 500-10000 exhibits excellent compatibility with a cellulose ester, and also no evaporation or volatilization occurs during film formation.

Polycondensation for a polyester is carried out via a common method. For example, the polyester can readily be synthesized via any method such as direct reaction of the above dibasic acid with glycol; a heat melt condensation method via polyesterification reaction or ester exchange reaction of the above dibasic acid or an alkyl ester thereof such as methyl ester of the dibasic acid with a glycol; or dehydrohalogenation reaction of an acid chloride of such an acid with glycol. A polyester featuring a weight average molecular weight which is not excessively large is preferably synthesized via the direct reaction. A polyester featuring higher distribution on the lower molecular weight side exhibits excellent compatibility with a cellulose ester, whereby there can be realized a cellulose ester film exhibiting minimal moisture permeability after film formation and further enhanced transparency.

As a method of controlling the molecular weight, any appropriate conventional method is employable with no specific limitation. For example, depending on polymerization conditions, via a method to block a molecular terminal with a monovalent acid or monohydric alcohol, the controlling can be realized by the added amount of such a monovalent substance. In this case, a monovalent acid is preferable from the viewpoint of stability of the polymer.

For example, listed are acetic acid, propionic acid, and butyric acid. There are selected those which tend not to be distilled away from the reaction system during polycondensation reaction but tend to be easily distilled away when such a monovalent acid is removed outside the reaction system after termination of the reaction. These can be used in combination. Further, in the case of direct reaction, the weight average molecular weight can also be controlled by weighing the timing of terminating the reaction based on the amount of water distilled away during the reaction. In addition, the controlling can be carried out by biasing the number of moles of glycol or a dibasic acid to be charged, or by controlling the reaction temperature.

A polyester according to the present invention is preferably contained at 1-40% by mass based on a cellulose ester, (Hard Coat Layer)

The polarizing plate protective film of the present invention is provided with a hard coat layer, which is preferably arranged on a cellulose ester film according to the present invention.

The hard coat layer of the present invention is provided on one side of the polarizing plate protective film.

As the hard coat layer, an, actinic radiation curable resin layer is preferably used.

The actinic radiation curable resin layer refers to a layer wherein its main component is a resin curable via crosslinking reaction induced by irradiation of actinic radiation such as UV radiation or electron beams. As such an actinic radiation curable resin, a component containing a monomer having an ethylenically unsaturated double bond is preferably used, and a hard coat layer is formed via curing thereof by irradiation of actinic radiation such as UV radiation or electron beams. As the actinic radiation curable resin, a UV curable resin and an electron beam curable resin can typically be listed, but a resin, which is cured via UV radiation irradiation, is preferable.

As the UV curable resin, there are used, for example, a UV curable urethane acrylate-based resin, a UV curable polyester acrylate-based resin, a UV curable epoxy acrylate based resin, a UV curable polyol acrylate-based resin, and a UV curable epoxy resin. Of these, a urethane acrylate-based resin is specifically preferable.

The UV curable urethane acrylate-based resin can readily be prepared commonly by allowing an acrylate-based monomer having a hydroxyl group such as 2-hydroxyethyl acrylate, 2-hydroxyethyl methacrylate (hereinafter, indicated as only "acrylate" to mean that a methacrylate is included in an acrylate), or 2-hydroxypropyl acrylate to further react with a resulting product obtained via reaction of an isocyanate monomer or a prepolymer with a polyester polyol. For example, those described in JP-A 59-151110 can be used.

For example, a mixture of 100 parts of UNIDIC 17-806 (produced by DIC Corp.) and 1 part of COLONATE L (produced by Nippon Polyurethane Industry Co., Ltd.) is preferably used.

The UV curable polyester acrylate-based resin includes any of those readily formed commonly via reaction of a 2-hydroxyethyl acrylate-based or 2-hydroxy acrylate-based monomer with a polyester polyol. For example, those described in JP-A 59-151112 can be used.

Specific examples of the UV curable epoxy acrylate-based resin include those formed in such as manner that a reactive diluting agent and a photoreaction initiator are added to an epoxy acrylate as an oligomer to perform reaction thereof. Those described in JP-A 1-105738 can be used.

Specific examples of the UV curable polyol acrylate-based resin include trimethylol propane triacrylate, ditrimethylol propane tetraacrylate, pentaerythritol triacrylate, pentaerythritol tetraacrylate, dipentaerythritol hexaacrylate, and alkyl-modified dipentaerythritol pentaacrylate.

Photoreaction initiators for these UV curable resins include, for example, benzoin and derivatives thereof, as well as acetophenone, benzophenone, hydroxy benzophenone, Michler's ketone, α-amyloxim ester, thioxanthone, and derivatives thereof, which may be used together with a photosensitizer. The above photoreaction initiators can also be used as photosensitizers. Further, a sensitizer such as n-butylamine, triethylamine, or tri-n-butyl phosphine can be used when an epoxy acrylate-based photoreaction initiator is employed. The amount of such a photoreaction initiator or a photosensitizer used for a UV curable resin composition is 0.1-15 parts by mass, preferably 1-10 parts by mass based on 100 parts by mass of the above composition.

Resin monomers include, for example, as monomers having one unsaturated double bond, common monomers such as methyl acrylate, ethyl acrylate, butyl acrylate, benzyl acrylate, cyclohexyl acrylate, vinyl acetate, or styrene. As monomers having at least 2 unsaturated double bonds, there are listed ethylene glycol diacrylate, propylene glycol diacrylate, divinyl benzene, 1,4-cyclohexane diacrylate, and 1,4-cyclohexyldimethyl diacrylate, as well as trimethylolpropane triacrylate and pentaerythritol tetraacrylate described above.

Commercially available products as UV' curable resins to be used in the present invention include the following which can selectively be employed, as appropriate: ADECAOPTOMER KR and BY Series such as KR-400, KR-410, KR-550, KR-566, KR-567, or BY 320B (produced by Asahi Denka Kogyo K.K.); KOEIHARD A-101-KK, A-101-WS, C-302, C-401-N, C-501, M-101, M-102, T-102, D-102, NS-101, FT-102Q8, MAG-1-P20, AG-106, and M-101-C (produced by Koei Chemical Co., Ltd.); SEIKABEAM PHC2210(S), PHC X-9(K-3), PHC2213, DP-10, DP-20, DP-30, P1000, P1100, P1200, P1300, P1400, P1500, P1600, SCR900 (produced by Dainichiseika Color & Chemicals Mfg. Co., Ltd.); KRM7033, KRM7039, KRM7130, KRM7131, UVECRYL29201, and UVECRYL29202 (produced by Daicel-UCP Co., Ltd.); RC 5015, RC-5016, RC-5020, RC-5031, RC-5100, RC 5102, RC-5120, RC-5122, RC-5152, RC-5171, RC-5180, and RC 5181 (produced by DIC Corp.); OLEX No. 340 Clear (produced by Chugoku Marine Paints, Ltd.); SONRAD H-601, RC-750, RC 700, RC-800, RC-500, RC-611, and RC-612 (produced by Sanyo Chemical Industries, Ltd.); SP 1509 and SP 1507 (produced by Showa Highpolymer Co., Ltd.); RCC-15C (produced by Grace Japan Co., Ltd.); and ARONIX M-6100, M-8030, and M-8060 (produced by Toagosei Co., Ltd.).

Further, examples of specific compounds include trimethylol propane triacrylate, ditrimethylol propane tetraacrylate, pentaerythritol triacrylate, pentaerythritol tetraacrylate, dipentaerythritol hexaacrylate, and alkyl modified dipentaerythritol pentaacrylate.

These actinic radiation curable resin layers can be applied on a substrate via an any appropriate method known in the art such as a gravure coater, a dip coater, a reverse coater, a wire bar coater, a die coater, or an ink-jet method.

Any light source to cure a UV curable resin via radiation curing reaction and then form a cured coating layer can be used with no specific limitation provided that the light source generates UV radiation. For example, a low-pressure mercury lamp, a medium-pressure mercury lamp, a high-pressure mercury lamp, an ultrahigh-pressure mercury lamp, a carbon arc lamp, a metal halide lamp, and a xenon lamp can be used. As these light sources, those of an air cooling type or a water cooling type are preferably used. Irradiation conditions depend on each of the lamps, and the irradiation amount of actinic radiation is preferably 5-300 mJ/cm$^2$, specifically preferably 20-200 mJ/cm$^2$.

Further, the oxygen concentration of an irradiated portion is preferably decreased to 0.01-2% via nitrogen purging.

Still further, irradiation of actinic radiation is preferably carried out while tension is provided in the film conveyance direction, more preferably while tension is provided also in the width direction. The tension provided is preferably 30-300 N/m. Tension providing methods are not specifically limited, and tension may be provided above a back roll in the conveyance direction, or tension may be provided in the width direction or in the biaxial direction using a tenter. Thereby, a film exhibiting further enhanced flatness can be realized.

As an organic solvent used for a coating liquid of a UV curable resin layer composition, any appropriate organic solvent can be selected from the following organic solvents: hydrocarbons such as toluene or xylene; alcohols such as methanol, ethanol, isopropanol, butanol, or cyclohexanol; ketones such as acetone, methyl ethyl ketone, or methyl isobutyl ketone; esters such as methyl acetate, ethyl acetate, or methyl lactate; glycol ethers; and other organic solvents. Optionally, any appropriate mixture thereof can be used. There are preferably used the above organic solvents containing a propylene glycol monoalkyl ether (the alkyl group has a carbon atom number of 1-4) or a propylene glycol monoalkyl ether acetic acid ester (the alkyl group has a carbon atom number of 1-4) at 5% by mass or more, more preferably at 5-80% by mass.

Further, a silicon compound specifically exhibiting surface active effects is preferably added in the coating liquid of a UV curable resin layer composition. For example, a polyether-modified silicone oil is preferably added. The number average molecular weight of the polyether-modified silicone oil is, for example, 1000-100000, but preferably 2000-50000. It is preferable to be 10000-100000 since a coated film dries fast and bleeding out tends not to occur on the coated film surface.

There are listed the following commercially available products as silicon compounds preferably used DKQ8-779 (a trade name of Dow Corning Corp.); SF3771, SF8410, SF8411, SF8419, SF8421, SF8428, SH200, SH510, SH1107, SH3749, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, and FS-1269 (all being trade names of Dow Corning Toray Silicone Co., Ltd.); KF-101, KF-100T, KF351, KF352, KF353, KF354, KF355, KF615, KF618, KF945, KF6004, SILICONE X-22-945, X22-160AS (all being trade names of Shin-Etsu Chemical Co., Ltd.); XF3940 and XF3949 (both being trade names of Toshiba Silicones Co., Ltd.); DISPARLON LS-009 (produced by Kusumoto Chemicals Ltd.); GLANOL410 (produced by Kyoeisha Chemical Co., Ltd.); TSF4440, TSF4441, TSF4445, TSF4446, TSF4452, and TSF4460 (produced by GE Toshiba Silicones Co., Ltd.); BYK-306, BYK-330, BYK-307, BYK-341, BYK-341, and BYK-361 (produced by BYK-Chemie Japan K.K.); and L Series (e.g., L-7001, L-7006, L-7604, and L-9000), Y Series, and FZ Series (FZ-2203, FZ-2206, and FZ-2207) (produced by Nippon Unicar Co., Ltd.).

As compounds exhibiting surface active effects, nonionic surfactants having an ethylene oxide chain can be added.

These components enhance coatability onto a substrate or underlayer. In cases of addition to the outmost layer of a laminated body, water repellency, oil repellency, and anti-staining properties of a coated film are enhanced, and also the effect of scratch resistance of the surface is produced. These components are preferably added in the range of 0.01-3% by mass based on the solid components in a coating liquid.

As a coating method of a UV curable resin composition coating liquid, any of the methods described above may be employed. The coated amount is appropriately 5-80 μm, preferably 10-70 μm in terms of the wet film thickness. Further, the dry film thickness is 1-50 μm, preferably 1-30 μm.

The dry film thickness of a hard coat layer is suitably determined in view of affects due to heat resulting from backlighting of a polarizing plate protective film.

A UV curable resin composition is preferably irradiated with UV radiation during or after coating and drying. To achieve an irradiation amount of 5-300 mJ/cm$^2$ described above of actinic radiation, the irradiation time is preferably 0.1 second-5 minutes, but more preferably 0.1-10 seconds from the viewpoint of curing efficiency of the UV curable resin and operational efficiency.

Further, the illuminances of these actinic radiation irradiated portions are preferably 50-150 mW/cm$^2$.

In order to prevent blocking and enhance scratch resistance, or to provide anti-glare properties and light diffusion properties and adjust refractive index, fine particles of inorganic compounds or organic compounds can be added to the thus-obtained cured resin layer.

Fine particles are preferably added to the hard coat layer of the present invention. Inorganic fine particles used include silicon oxide, titanium oxide, aluminum oxide, zirconium oxide, magnesium oxide, calcium carbonate, calcium carbonate, talc, clay, fired kaolin, fired calcium silicate, hydrated calcium silicate, aluminum silicate, magnesium silicate, and calcium phosphate. Especially, silicon oxide, titanium oxide, aluminum oxide, zirconium oxide, and magnesium oxide are preferably used.

Further, organic fine particles to be added to a UV' curable resin composition include polymethyl methacrylate resin powder, acrylic styrene-based resin powder, polymethyl methacrylate resin powder, silicon resin powder, polystyrene resin powder, polycarbonate resin powder, benzoguanamine resin powder, melamine resin powder, polyolefin resin powder, polyester resin powder, polyamide resin powder, polyimide resin powder, and polyfluoroethylene resin powder. There are specifically preferably listed cross-linked polystyrene particles (e.g., SX 130H, SX-200H, and SX-350H produced by Soken Chemical & Engineering Co., Ltd.) and polymethyl methacrylate-based particles (e.g., MX 150 and MX-300 produced by Soken Chemical & Engineering Co., Ltd.).

The average particle diameter of these fine particle powders is preferably 0.005-10 μm, specifically preferably 0.01-5 μm. The blending ratio of the fine particle powder to a UV curable resin composition is preferably 0.1-30 parts by mass based on 100 parts by mass of the resin composition.

The UV curable resin layer is preferably a hard coat layer featuring a center line average roughness (Ra) of 1-50 nm, which is defined by JIS B 0601, or an anti-glare layer featuring Ra of about 0.1-1 μm. The center line average roughness (Ra) is preferably determined using a surface roughness tester of an optical interference type. The determination can be carried out using, for example, WYKO-made RST/PLUS.

Further, antistatic agents are also preferably contained in the hard, coat layer of the present invention. Such antistatic agents are preferably electrical conductive materials containing, as a main component, at least one element selected from the group including Sn, Ti, In, Al, Zn, Si, Mg, Ba, Mo, W, and V; and also featuring a volume resistivity of at most $10^7$ Ω·cm.

As the antistatic agents, metal oxides and composite oxides containing any of the above elements are listed.

As the metal oxides, there are preferable, for example, ZnO, $TiO_2$, $SnO_2$, $Al_2O_3$, $In_2O_3$, $SiO_2$, MgO, BaO, $MoO_2$, and $V_2O_5$, or composite oxides thereof. Of these, ZnO, $In_2O_3$, $TiO_2$, and $SnO_2$ are specifically preferable. With regard to examples of inclusion of a different type of atom, it is effective that Al or In is added to ZnO; Nb or Ta is added to $TiO_2$; or Sb, Nb, or a halogen element is added to $SnO_2$. The amount of such a different type of atom added is preferably in the range of 0.01-25 mol %, specifically preferably 0.1-15 mol %. The volume resistivities of these metal oxide powders featuring electrical conductivity are at most $10^7$ Ω·cm, specifically at most $10^5$ Ω·cm.

(Cellulose Esters)

In the cellulose ester film of the present invention, a cellulose ester, a main component, is preferably a lower fatty acid ester of cellulose. The lower fatty acid in the lower fatty acid ester of cellulose refers to a fatty acid having a carbon atom number of at most 6. There can be used, for example, cellulose acetate, cellulose propionate, and cellulose butyrate, as well as a mixed fatty acid ester such as cellulose acetate propionate or cellulose acetate butyrate as described in JP-A Nos. 10-45804 and 8-231761, and U.S. Pat. No. 2,319,052. Of these described above, a lower fatty acid ester of cellulose preferably used is cellulose triacetate and cellulose acetate propionate. These cellulose esters can be used individually or in combination.

In the case of cellulose triacetate, those featuring an average acetylation degree (the amount of acetic acid combined) of 54.0-62.5% are preferably used. However, cellulose triacetate of an average acetylation degree of 58.0-62.5% is more preferably used.

Preferable cellulose esters other than cellulose triacetate are ones having an acyl group of a carbon number of 2-4 as a substituent and simultaneously satisfying following Expressions (III) and (IV), provided that the acetyl group substitution degree is Ac and the substitution degree of an aliphatic acid ester group of a carbon number of 3-4 is Pr.

$$2.1 \leq Ac+Pr \leq 2.9 \quad \text{(III)}$$

$$1.0 \leq Ac \leq 2.9 \quad \text{(IV)}$$

wherein Ac is the acetyl group substitution degree and Pr is the substitution degree of an aliphatic acid ester group of a carbon number of 3-4.

Of these, preferable is cellulose acetate propionate satisfying $1.0 \leq Ac \leq 2.0$ and $0.5 \leq Pr \leq 1.9$. Portions unsubstituted with an acyl group usually exist as hydroxyl groups. These can be synthesized via any appropriate method known in the art.

Further, the acyl group substitution degree thereof can be determined based on the method specified by ASTM-D817-96.

With regard to the cellulose esters, cellulose esters synthesized using a raw material such as cotton linter, wood pulp, or kenaf can be employed individually or in combination. Especially, cellulose esters synthesized from cotton linter (hereinafter, also referred to simply as linter) are preferably used individually or in combination.

When the molecular weight of the cellulose ester is relatively large, the variation rate of heat elastic modulus becomes smaller. However, when the molecular weight thereof is excessively large, the viscosity of a dissolved liquid of the cellulose ester becomes excessively large, resulting in poor productivity. The molecular weight of the cellulose ester is preferably 30000-200000, more preferably 40000-170000 in terms of number average molecular weight (Mn).

Further, to achieve the effects of the present invention, the ratio Mw/Mn of the weight average molecular weight (Mw) to the number average molecular weight (Mn) with respect to the cellulose ester is preferably 1.4-3.0, more preferably 1.7-2.2.

The average molecular weights and molecular weight distribution of the cellulose ester is determined by a method known in the art via high-performance liquid chromatography. Using this, the number average molecular weight and the weight average molecular weight are derived to calculate the ratio (Mw/Mn).

Determination conditions are as follows:

Solvent: Methylene chloride

Column: Shodex K80$, K805, and K803G (These three columns produced by Showa Denko K. K. were connected for this use.)

Column temperature: 25° C.

Sample concentration: 0.1% by weight

Detector: RI Model 504 (produced by GL Sciences Inc.)

Pump: L6000 (produced by Hitachi, Ltd.)

Flow rate: 1.0 ml/minute

Calibration curve: A calibration curve, based on 13 samples of Standard Polystyrene STK, standard polystyrene (produced by Tosoh Corp.) featuring a molecular weight of 1000000-500, was used. The 13 samples are preferably used at nearly even intervals.

One gram of a cellulose ester is added into 20 ml of purified water (electrical conductivity: at most 0.1 μS/cm; and pH: 6.8), followed by stirring at 25° C. for 1 hour under a nitrogen ambience preferably at pH of 6-7 and an electrical conductivity of 1-100 μS/cm. When the pH is less than 6, deterioration of cellulose may be promoted by residual organic acids during heat melt. When the pH is more than 7, hydrolysis may be promoted. Further, when the electrical conductivity is at least 100 μS/cm, it is thought that the existence of a relatively large amount of residual ions becomes a factor deteriorating the cellulose during heat melt.

(Plasticizers)

It is preferable that no conventionally used low molecular weight plasticizer, low molecular weight UV absorbent, or low molecular weight antioxidant is essentially contained in a dope to be used to form the cellulose ester film of the present invention. However, a small amount of a low molecular weight plasticizer or low molecular weight UV absorbent may supplementarily be added, if appropriate, to the extent that no deposition thereof occurs. As plasticizers added, materials tending not to increase retardation Rt, for example, materials having no aromatic ring are preferable.

For the cellulose ester film of the present invention, the following plasticizers can be used.

As phosphoric acid ester-based plasticizers, there are specifically listed alkyl phosphate esters such as triacetyl phosphate or tributyl phosphate; cycloalkyl phosphate esters such as tricyclopenty/phosphate or cyclohexyl phosphate; and aryl phosphate esters such as triphenyl phosphate, tricresyl phosphate, cresyl phenyl phosphate, cetyl diphenyl phosphate, diphenyl biphenyl phosphate, trioctyl phosphate, tributyl phosphate, trinaphthyl phosphate, trixylyl phosphate, or trisortho-biphenyl phosphate. These substituents may be the same or different, or may further be substituted. Further, any combination of an alkyl group, a cycloalkyl group, and an aryl group may be possible. It is also possible that these substituents are bonded to each other via covalent bonding.

Further, there are listed an alkylenebis(dialkyl phosphate) such as ethylenebis(dimethyl phosphate) or butylenebis(diethyl phosphate); an alkylenebis(diaryl phosphate) such as ethylenebis(diphenyl phosphate) or propylenebis(dinaphtyl phosphate); an arylenebis(dialkyl phosphate) such as phenylenebis(dibutyl phosphate) or biphenylenebis(dioctyl phosphate); and an arylenebis(diaryl phosphates) such as phenylenebis(diphenyl phosphate) or naphtylenebis(ditoluyl phosphate). These substituents may be the same or different, and may further be substituted. Further, any combination of an alkyl group, a cycloalkyl group, and an aryl group may be possible. It is also possible that these substituents are bonded to each other via covalent bonding.

Furthermore, a partial structure of the phosphoric acid ester may be a part of a polymer or may regularly be substituted. It is also possible to be introduced into a part of the molecular structure of an additive such as an antioxidant, an acid scavenger, or a UV absorbent. Of the above compounds, an aryl phosphate ester and an arylenebis(diaryl phosphate) are preferable, and specifically, triphenyl phosphate and phenylenebis(diphenyl phosphate) are preferable.

As ethylene glycol ester-based plasticizers, there are specifically listed an ethylene glycol alkyl ester-based plasticizer such as ethylene glycol diacetate or ethylene glycol dibutyrate; an ethylene glycol cycloalkyl ester-based plasticizer such as ethylene glycol dicyclopropyl carboxylate or ethylene glycol dicyclohexyl carboxylate; and an ethylene glycol aryl ester-based plasticizer such as ethylene glycol dibenzoate or ethylene glycol di-4-methyl benzoate. These alkylate groups, cycloalkylate groups, and arylate groups may be the same or different, or may further be substituted. Any combination of an alkylate group, a cycloalkylate group, and an arylate group may be possible. It is also possible that these substituents are bonded to each other via covalent bonding. Further, an ethylene glycol portion may be substituted and a partial structure of the ethylene glycol ester may be a part of a polymer or may regularly be substituted. It is also possible to be introduced into a part of the molecular structure of an additive such as an antioxidant, an acid scavenger, or a UV absorbent.

As glycerin ester-based plasticizers, there are specifically listed a glycerin alley ester such as triacetin, tributylin, glycerin diacetate caprylate, or glycerin oleate propionate; a glycerin cycloalkyl ester such as glycerin tricyclopropyl carboxylate or glycerin tricyclohexyl carboxylate; a glycerin aryl ester such as glycerin tribenzoate or glycerin 4-methylbenzoate; a diglycerin alkyl ester such as diglycerin tetraacetylate, diglycerin tetrapropionate, diglycerin acetate tricaprylate, or diglycerin tetralaurate; a diglycerin cycloalkyl ester such as diglycerin tetracylobutyl carboxylate or diglycerin tetracylopentyl carboxylate; and a diglycerin aryl ester such as diglycerin tetrabenzoate or diglycerin 3-methyl benzoate. These alkylate groups, cycloalkyl carboxylate groups, and arylate groups may be same or different, or may further be substituted.

Further, any combination of an alkylate group, a cycloalkyl carboxylate group, and an arylate group may be possible. It is also possible that these substituents are bonded to each other via covalent bonding. A glycerin or diglycerin portion may also be substituted, and a partial structure of the glycerin ester or the diglycerin ester may be a part of a polymer or may regularly be substituted. It is also possible to be introduced into a part of the molecular structure of an additive such as an antioxidant, an acid scavenger, or a UV absorbent.

As polyhydric alcohol ester-based plasticizers, there are specifically listed an alkyl polycarboxylic acid alkyl ester based plasticizer such as tridodecyl tricarbalate or tributyl-meso-butane-1,2,3,4-tetracarboxylate; an alkyl polycarboxylic acid cycloalkyl ester-based plasticizer such as tricyclohexyl tricarbalate or tricyclopropyl-2-hydroxy-1,2,3-propane tricarboxylate; an alkyl polycarboxylic acid aryl ester-based plasticizer such as triphenyl-2-hydroxy-1,2,3-propane tricarboxylate or tetra3-methylphenyltetrahydrofuran-2,3,4,5-tetracarboxylate; a cycloalkyl polycarboxylic acid alkyl ester-based plasticizer such as tetrahexyl-1,2,3,4-cyclobutane tetracarboxylate or tetrabutyl-1,2,3,4-dicyclopentane tetracarboxylate; a cycloalkyl polycarboxylic acid cycloalkyl ester-based plasticizer such as tetracyclopropyl-1,2,3,4-cyclobutane tetracarboxylate or tricyclohexyl-1,3,5-cyclohexyl tricarboxylate; a cycloalkyl polycarboxylic acid aryl ester-based plasticizer such as triphenyl-1,3,3-cyclohexyl tricarboxylate or hexa4-methylphenyl-1,2,3,4,3,6-cyclohexyl hexacarboxylate; an aryl polycarboxylic acid alkyl ester-based plasticizer such as tridodecylbenzene-1,2,4-tricarboxylate or tetraoctylbenzene-1,2,4,5-tetracarboxylate; an aryl polycarboxylic acid cycloalkyl ester-based plasticizer such as tricyclopentylbenzene-1,3,5-tricarboxylate or tetracyclohexylbenzene-1,2,3,5-tetracarboxylate; and an aryl polycarboxylic acid aryl ester-based plasticizer such as triphenyibenzene-1,3,5-tetracarboxylate or hexa4-methylphenyl-benzene-1,2,3,4,5,6-hexacarboxylate. These alkoxy groups and cycloalkoxy groups may be the same or different, or may also be monosubstituted. These substituents may further be substituted. Any combination of an alkyl group and a cycloalkyl group may be possible. It is also possible that these substituents are bonded to each other via covalent bonding. The aromatic ring of phthalic acid may further be substituted, and a multimer such as a dimer, trimer, or tetramer may be possible. Further, a partial structure of the phthalic acid ester may be a part of a polymer or may regularly be substituted with a polymer. It is also possible to be introduced into a part of the molecular structure of an additive such as an antioxidant, an acid scavenger, or a UV absorbent.

As dicarboxylic acid ester-based plasticizers, there are specifically listed an alkyl dicarboxylic acid alkyl ester-based plasticizer such as didodecyl malonate (C1), dioctyl adipate (C4), or dibutyl sebacate (C8); an alkyl dicarboxylic acid cycloalkyl ester-based plasticizer such as dicyclopentyl succinate or dicyclohexyl adipate; an alkyl dicarboxylic acid aryl ester-based plasticizer such as diphenyl succinate or di4 methylphenyl glutarate; a cycloalkyl dicarboxylic acid alkyl ester-based plasticizer such as dihexyl-1,4-cyclohexane dicarboxylate or didecylbicyclo[2.2.1]heptane-2,3-dicarboxylate; a cycloalkyl dicarboxylic acid cycloalkyl ester-based plasticizer such as dicyclohexyl-1,2-cyclobutane dicarboxylate or dicyclopropyl-1,2-cyclohexyl dicarboxylate; a cycloalkyl dicarboxylic acid aryl ester-based plasticizer such as diphenyl-1,1-cyclopropyl dicarboxylate or di2-naphthyl-1,4-cyclohexane dicarboxylate; an aryl dicarboxylic acid alkyl ester-based plasticizer such as diethyl phthalate, dimethyl phthalate, dioctyl phthalate, dibutyl phthalate, or di2-ethylhexyl phthalate; an aryl dicarboxylic acid cycloalkyl ester-based plasticizer such as dicyclopropyl phthalate or dicyclohexyl phthalate; and an aryl dicarboxylic acid aryl ester-based plasticizer such as diphenyl phthalate or di4-methylphenyl phthalate. These alkoxy groups and cycloalkoxy groups may be the same or different, or may also be monosubstituted. These substituents may further be substituted. Any combination of an alkyl group and a cycloalkyl group may be possible. It is also possible that these substituents are bonded to each other via covalent bonding. The aromatic ring of phthalic acid may further be substituted, and a multimer such as a dimer, trimer, or tetramer may be possible. Further, a partial structure of the phthalic acid ester may be a part of a polymer or may regularly be substituted with a polymer. It is also possible to be introduced into a part of the molecular structure of an additive such as an antioxidant, an acid scavenger, or a UV absorbent.

As polycarboxylic acid ester-based plasticizers, there are specifically listed an alkyl polycarboxylic acid alkyl ester-based plasticizer such as tridodecyl tricarbalate or tributyl-meso-butane-1,2,3,4-tetracarboxylate; an alkyl polycarboxylic acid cycloalkyl ester-based plasticizer such as tricyclohexyl tricarbalate or tricyclopopyl-2-hydroxy-1,2,3-propane tricarboxylate; an alkyl polycarboxylic acid aryl ester-based plasticizer such as triphenyl-2-hydroxy-1,2,3-propane tricarboxylate or tetra3-methylphenyltetrahydrofuran-2,3,4,5-tetracarboxylate; a cycloalkyl polycarboxylic acid alkyl ester-based plasticizer such as tetrahexyl-1,2,3,4-cyclobutane tetracarboxylate or tetrabutyl-1,2,3,4-dicyclopentane tetracarboxylate; a cycloalkyl polycarboxylic acid cycloalkyl ester-based plasticizer such as tetracyclopropyl-1,2,3,4-cyclobutane tetracarboxylate or tricyclohexyl-1,3,5-cyclohexyl tricarboxylate; a cycloalkyl polycarboxylic acid aryl ester-based plasticizer such as triphenyl-1,3,5-cyclohexyl tricarboxylate or hexa4-methylphenyl-1,2,3,4,5,6-cyclohexyl hexacarboxylate; an aryl polycarboxylic acid alkyl ester-based plasticizer such as tridodecylbenzene-1,2,4-tricarboxylate or tetraoctylbenzene-1,2,4,5-tetracarboxylate; an aryl polycarboxylic acid cycloalkyl ester-based plasticizer such as tricyclopentylbenzene-1,3,5-tricarboxylate or tetracyclohexylbenzene-1,2,3,5-tetracarboxylate; and an aryl polycarboxylic acid aryl ester-based plasticizer such as triphenylbenzene-1,3,5-tetracarboxylate or hexa4-methylphenylbenzene-1,2,3,4,5,6-hexacarboxylate. These alkoxy groups and cycloalkoxy groups may be the same or different, or may also be monosubstituted. These substituents may further be substituted. Any combination of an alkyl group and a cycloalkyl group may be possible. It is also possible that these substituents are bonded to each other via covalent bonding. The aromatic ring of phthalic acid may further be substituted, and a multimer such as a dimer, trimer, or tetramer may be possible. Further, a partial structure of the phthalic acid ester may be a part of a polymer or may regularly be substituted with a polymer. It is also possible to be introduced into a part of the molecular structure of an additive such as an antioxidant, an acid scavenger, or a UV absorbent.

(UV Absorbents)

A UV absorbent is incorporated in a polarizing plate protective film and another film used for a liquid crystal image display. The UV absorbent functions to prevent deterioration of liquid crystals or polarizing films in cases of outdoor use. A UV absorbent is preferably used for the cellulose ester film of the present invention. It is preferable for the UV absorbent to exhibit excellent performance of absorbing UV radiation of a wavelength of at most 370 nm, absorb the visible light of a wavelength of at least 400 nm as little as possible, and exhibit a transmittance of at least 50%. Especially, the transmittance at a wavelength of 370 nm is preferably at most 10%, more preferably at most 5%. UV absorbents usable in the present invention include, for example, oxybenzophenone-based compounds, benzotriazole-based compounds, salicylic acid ester-based compounds, benzophenone-based compounds, cyanoacrylate based compounds, and nickel complex salt-based compounds. Of these, benzotriazole-based compounds are preferable due to slight coloring. Benzotriazole-based UV absorbents and benzophenone-based UV absorbents, which exhibit light stability, are preferable. The benzotriazole-based UV absorbents with less unneeded color are specifically preferable. For example, TINUVIN 109, TINUVIN 171, TINUVIN 326, TINUVIN 327, and TINUVIN 328 (produced by Ciba Specialty Chemicals, Ltd.) can preferably be used. A low molecular weight UV absorbent may be deposited on a web or volatilized during film formation, similarly to a plasticizer, depending on the used amount thereof. Therefore, the added amount thereof is 1-10% by mass.

In the present invention, a polymer UV absorbent, which is less likely to be deposited than the above low molecular weight UV absorbent, is preferably incorporated in a cellulose ester film, together with a polymer according to the present invention. Thereby, no dimensional stability, retention properties, or moisture permeability deteriorates and no phase separation occurs in the film, resulting in sufficient cutting of UV radiation in such a stable condition. As polymer UV absorbents useful for the present invention, the polymer UV absorbents described in JP-A 6-148430 and polymers containing UV absorbent monomers can be used with no limitation.

UV absorbents, UV absorbing monomers, and intermediates thereof can be synthesized with reference to appropriate references known in the art. For example, the synthesis can be carried out with reference to the following: for example, U.S. Pat. Nos. 3,072,585, 3,159,646, 3,399,173, 3,761,272, 4,028,331, and 5,683,861; European Patent No, 86,300,416; JP-A Nos. 63-227575 and 63-185969; Polymer Bulletin, V. 20(2), 169-176; and Chemical Abstracts, V. 109, No. 191389.

When a UV absorbent and a UV absorbing polymer used in the present invention are mixed with another transparent polymer, a low molecular weight compound, a polymer, or an inorganic compound may be used together, if appropriate. For example, it is one of the preferred embodiments that a UV absorbent used in the present invention and another low molecular weight UV absorbent are simultaneously mixed with another transparent polymer; or optionally a UV absorbing polymer used in the present invention and another low molecular weight UV absorbent are simultaneously mixed with another transparent polymer. Similarly, it is one of the preferred embodiments that additives such as an antioxidant, a plasticizer, and a flame retardant are simultaneously mixed.

As methods of adding a UV absorbent or a UV absorbing polymer used in the present invention to a cellulose ester film, either inclusion thereof in the cellulose ester film or coating thereof on the cellulose ester film may be carried out. In cases of inclusion in the cellulose ester film, either direct addition or in-line addition may be performed. The in-line addition is a method of addition into a dope composition using a mixer such as an in-line mixer after previous dissolution in an organic solvent (e.g., methanol, ethanol, and methylene chloride).

The amount of a UV absorbent or a UV absorbing polymer used in the present invention varies with the type of the compound and the using conditions. In the case of the UV absorbent, the amount is preferably 0.2-3.0 g per $m^2$ of a cellulose ester film, more preferably 0.4-2.0 g, specifically preferably 0.5-1.5 g. Further, in the case of the UV absorbing polymer, the amount is preferably 0.6-9.0 g per $m^2$ of the cellulose ester film, more preferably 1.2-6.0 g, specifically preferably 1.5-3.0 g.

Further, preferable is a substance exhibiting excellent performance of absorbing UV radiation of a wavelength of at most 380 nm from the viewpoint of preventing liquid crystal deterioration, and also absorbing the visible light of at least 400 nm only to a minor extent from the viewpoint of realizing excellent liquid crystal display performance. In the present invention, especially, it is preferable that the transmittance at a wavelength of 380 nm be at most 8%, more preferably at most 4%, specifically preferably at most 1%.

Commercially available products usable in the present invention as UV absorbent monomers include UVM-1, which is (2-benzotriazole)-2-hydroxy-S-(2-vinyloxycarbonylethyl) benzene, and reaction type UV absorbent RUVA-93, which is 1-(2-benzotriazole)-2-hydroxy-5-(2-methacryloyloxyethyl) benzene (produced by Otsuka Chemical Co., Ltd.), or similar compounds thereof. Polymers homopolymerized therewith or copolymers copolymerized therewith are also preferably used with no Limitation. For example, as a commercially available polymer UV absorbent, PUVA-30M (produced Otsuka Chemical Co., Ltd.) is also preferably used. At least 2 types of such UV absorbents may be used. With regard to a method of adding a UV absorbent to a dope, the UV absorbent may be dissolved in an organic solvent such as alcohol, methyl chloride, dioxolane, or methyl acetate, followed by addition; or direct addition into the dope composition may be carried out.

An antioxidant may be incorporated the cellulose ester film of the present invention. For example, there may be incorporated a peroxide decomposing agent, a radical chain inhibitor, a metal deactivator, or an acid scavenger, as described in JP-A No. 5-197073. The amount of any of these compounds added is preferably 1 ppm-1.0% by mass, more preferably 10-1000 ppm, based on the cellulose ester.

Further, in the present invention, a fine particle matting agent is preferably incorporated in the cellulose ester film. As the fine particle matting agent, there are preferably incorporated, inorganic fine particles of, for example, silicon dioxide, titanium dioxide, aluminum oxide, zirconium oxide, calcium carbonate, kaolin, talc, fired calcium silicate, hydrated calcium silicate, aluminum silicate, magnesium silicate, or calcium phosphate; or cross-linked polymer fine particles. Of these, silicon dioxide is preferable in view of reduced haze of the film. The average particle diameter of the secondary particles of the fine particles is preferably in the range of 0.01-1.0 μm, and the content thereof is preferably 0.005-0.3% by mass based on the cellulose ester. Fine particles such as silicon dioxide are frequently surface-treated with an organic substance. Such treatment is preferable since reduced haze of the film is realized. Organic substances for the surface treatment include halosilanes, alkoxysilanes (specifically, alkoxysilanes having a methyl group), silazane, and siloxane. Fine particles featuring a relatively large average particle diameter produce a greater matting effect, while fine particles featuring a relatively small average particle diameter exhibit excellent transparency. Accordingly, the average particle diameter of the primary fine particles of the fine particles is preferably 5-50 nm, more preferably 7-16 nm. It is preferable for these fine particles to usually exist as aggregates in the cellulose ester film to form uneven portions of 0, 01-1.0 μm on the surface of the cellulose ester film. Fine particles of silicon dioxide include AEROSIL 200, 200V, 300, 8972, R972V, 8974, 8202, 8812, OX50, and TT600 (produced by Aerosil Co., Ltd.). Of these, AEROSIL 200V, 8972, R972V, R974, 8202, and R812 are preferable. At least 2 types of these matting agents may be combined. In cases of combination of at least 2 types thereof, usage at any combination ratio may be possible, In this case, matting agents differing in average particle diameter or material, for example, AEROSIL 200V and R972V, can be used in the range of a mass ratio of 0.1:99.9-99.9-0.1.

Subsequently, a method of producing the cellulose ester film of the present invention will now be described.

Now, a preparation method of a cellulose ester dope used in the present invention will be described. A flake-formed cellulose ester is dissolved in an organic solvent, mainly containing a good solvent to the cellulose ester, in a dissolving vessel while stirring to form a dope. With regard to the dissolution, there are various dissolution methods such as a method conducted at ordinary pressure; a method conducted at the boiling point or less of a main solvent; a method conducted under pressure at the boiling point or more of the main solvent; a method conducted via a cooling dissolution method as described in JP-A Nos. 9-95544, 9-95557, or 9-95538; and a method conducted under high pressure as described in JP-A No. 11-21379. After dissolution, the dope is filtered with a filtering material and then defoamed, followed by being sent to the following step. The cellulose ester concentration in the dope is approximately 10-35% by mass, more preferably 15-25% by mass. In order to incorporate a polymer useful for the present invention into a cellulose ester dope, a polymer, having previously been dissolved in an organic solvent, is added, or is directly added in the cellulose ester dope. These addition methods are carried out with no limitation. In this case, the polymer is added so that no cloudiness or phase separation thereof occurs in the dope. The added amount is as described above.

As organic solvents as good solvents to the cellulose ester, there can be used methyl acetate, ethyl acetate, amyl acetate, ethyl formate, acetone, cyclohexanone, methyl acetoacetate, tetrahydrofuran, 1,3-dioxolane, 4-methyl-1,3-dioxolane, 1,4-dioxane, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2 pyrrolidone, N-methyl.-2-pyrrolidone, 1,3-dimethyl-2-imidasolidinone, methylene chloride, and bromopropane. Of these, methyl acetate, acetone, and methylene chloride are preferably used.

However, non-chlorine based organic solvents tend to be preferably used in view of recent environmental concerns. A lower alcohol such as methanol, ethanol, or butanol is preferably used along with any of these organic solvents, since the solubility of the cellulose ester in the organic solvent can be enhanced and the viscosity of the dope can be reduced. Especially, ethanol is preferable due to its relatively low boiling point and minimal toxicity.

As an organic solvent employed for a dope used in the present invention, a mixture of a good solvent and a poor solvent to the cellulose ester is preferably used from the viewpoint of production efficiency. The mixture ratio of the good solvent and the poor solvent is preferably in the range of 70-98% by mass with respect to the good solvent and in the range of 2-30% by mass with respect to the poor solvent. The good solvent and the poor solvent used in the present invention are defined as follows: a solvent capable of dissolving, on its own, a cellulose ester used is a good solvent, while a solvent incapable of carrying out the dissolution on its own is a poor solvent.

Poor solvents employed for the dope used in the present invention are not specifically limited. There can preferably be used, for example, methanol, ethanol, n-butanol, cyclohexane, acetone, and cyclohexanone. In the case of an organic solvent chosen for the polymer of the present invention, a good solvent to the cellulose ester is preferably used. As described above, when a low molecular weight plasticizer is used, any common addition method can be carried out. Direct addition into the dope or injection into the dope after previous dissolution in an organic solvent may be performed.

In the present invention, when various additives described above are added to a cellulose ester dope, it is preferable that a solution, in which the cellulose ester dope and the various additives are dissolved together with a small amount of the cellulose ester, is mixed via in-line addition. For example, an in-line mixer such as static mixer SWJ (Toray static in-line mixer, Hi-Mixer (produced by Toray Engineering Co., Ltd.) is preferably used. The in-line mixer is preferably applied to a dope in which the cellulose ester has been subjected to concentration dissolution under high pressure. Any type of a pressurizing container is employable, provided that the container can withstand a prescribed pressure, and can perform heating and stirring under pressure.

In the present invention, a cellulose ester dope is filtered to eliminate foreign substances, specifically ones which may mistakenly be recognized as images on the screen of a liquid crystal image display. It could be said that the quality of a polarizing plate protective film is determined by this filtration. The absolute filtration accuracy of a filtering material used in this filtration is preferably relatively small. However, when the absolute filtration accuracy is excessively small, clogging of the filtering material tends to occur, and thus the filtering material needs to be frequently replaced, resulting in the problem of poor productivity. Therefore, the absolute filtration accuracy of the filtering material for the cellulose ester dope of the present invention is preferably at most 0008 mm, and more preferably in the range of 0.001-0.008 mm, still more preferably 0.003-0.006 mm.

Materials for the filtering material are not specifically limited, and common filtering materials can be used. However, filtering materials made of plastic fibers such as polypropylene or TEFLON (a registered trademark) or filtering materials made of metal such as stainless steel fibers are preferable in the view of the fact that there is no fiber dropping. Filtration of the cellulose ester dope of the present invention can be performed via a common method. However, preferable is a method in which filtration is carried out while heating under pressure at a temperature of at least the boiling point of a used solvent under ordinary pressure, as well as at a temperature in the range where the solvent does not boil, since an increase in differential pressure prior to and after filtration (hereinafter also referred to as filtration pressure) is minimized. The preferable temperature range is 45-120° C., more preferably 45-70° C., still more preferably 45-55° C. The filtration pressure is preferably smaller. The filtration pressure is preferably at most $1.6 \times 10^6$ Pa, more preferably at most $1.2 \times 10^6$ Pa, still more preferably at most $1.0 \times 10^6$ Pa.

When a cellulose ester, unsubstituted with an acyl group or of a low degree of substitution thereof, is contained in cellulose as a raw material, a foreign substance defect (hereinafter also referred to as a luminescent spot) may occur. The luminescent spot refers to a phenomenon wherein a cellulose ester film is placed between two polarizing plates arranged in an orthogonal state (cross-nicol state); light is irradiated from one side and observation is carried out from the other side using an optical microscope (50 magnification); than when the cellulose ester film is normal, the light is blocked, resulting in darkness, that is, nothing to be seen; however, when foreign substances exist, the light leaks therefrom, leading to luminescent spots to be seen. Actual damage becomes more severe in the case of a liquid crystal image display, when the diameter of the luminescent spots is large. Accordingly, the diameter is preferably at most 50 μm, more preferably 10 μm, still more preferably 8 μm.

Incidentally, the diameter of a luminescent spot refers to a value determined as the diameter of a perfect circle having the same area as the projected area of the luminescent spot. Existence of luminescent spots of the above diameter at a rate of at most 400 spots/cm$^2$ is not practically problematic, preferably at most 300 spots/cm$^2$, more preferably at most 200 spots/cm$^2$. In order to reduce the number of occurrence and the size of such luminescent spots, it is necessary to sufficiently filter minute foreign substances. Further, there can preferably be employed a method in which a pulverized product of a cellulose ester film, having been formed, is added again to a dope at a certain ratio for use as raw materials for a cellulose ester and additives thereof, as described in JP-A No. 2000-137115, since luminescent spots can be reduced.

Next, a process of casting a cellulose ester dope on a metal support, a drying process conducted on the metal support, and a process of peeling a web from the metal support will now be described. The metal support is an endless metal belt which moves in an endless manner or a rotating metal drum with a mirror-finished surface. The casting process is one in which a done, as described above, is sent to a pressure die through a pressure-type metering gear pump, and the dope is cast from the pressure die onto the metal support at a casting position. Another casting method includes a doctor blade method in which the thickness of a cast dope film is adjusted with a blade; and a method employing a reverse roll coater in which such adjustment is carried out with a reversely rotating roll. Of these, the pressure die is preferable since the slit shape of the head portion can be adjusted and the film thickness is readily controlled to be uniform. The pressure die includes a coat hanger die and a T die, any of which is preferably used To raise the film forming rate, lamination may be carried out by dividing the dope amount via arrangement of at least 2 pressure dies above the metal support. To control the film thickness, it is preferable to control the dope concentration, the liquid sending amount of the pump, the slit distance of the die head, the pushing pressure of the die, and the speed of the metal support to achieve a desired thickness.

The drying process performed on a metal support is one in which a web (a dope film after having been cast on the metal support is designated as a web) is heated on the support to evaporate solvents. As methods of evaporating the solvents, there are a method in which hot air is blown from the web side and the rear side of the support; a method in which heat transfer is carried out from the rear side of the support using heated liquid; and a method in which heat transfer is performed from the front and rear sides using radiation heat. Further, these methods are preferably combined, if appropriate. When the film thickness of the web is smaller, drying is done more rapidly. The temperature of the metal support may be the same entirely thereover or different by location.

As a method of drying conducted on a metal support suitably used in the present invention, casting is preferably carried out, for example, at a temperature of the metal support of 0-40° C., preferably at a temperature of 5-30° C. The temperature of dry air blown onto the web is preferably 30-45° C., but is not limited thereto.

The peeling process is one in which an organic solvent is evaporated on a metal support and then a web is peeled before the metal support makes one revolution. Thereafter, the web is conveyed to the drying process. The position at which the web is peeled from the metal support is referred to as a peeling point, and a roll aiding the peeling is called a peeling roll. Depending on the web thickness, when the residual solvent amount (refer to the expression to be described later) of the web at the peeling point is excessively large, peeling is difficult to carry out, and in contrast, when peeling is carried out after sufficient drying on the support, a part of the web may be removed in the middle of peeling. The web is commonly peeled at a residual solvent amount of 20-180% by mass.

In the present invention, the residual solvent amount for peeling is preferably 20-40% by mass or 60-150% by mass, specifically preferably 80-140% by mass. As a method for increasing the film forming rate (which can increase the film forming rate since peeling is performed while the residual solvent amount is as large as possible), there is a gel casting method in which peeling can be done even when the residual solvent amount is relatively large. Such a method includes a method in which a poor solvent to a cellulose ester is added in a dope, and the dope is cast, followed by gelation; and a method of gelling by decreasing the temperature of the support. There is further a method in which a metal salt is added to the dope. Strengthening the film via gelation on the support makes it possible to promote peeling and then increase the film forming rate. Peeling with a larger amount of the residual solvent tends to result in deteriorated flatness during peeling, or occurrence of wrinkles or longitudinal streaks due to peeling tension when the web is excessively soft. Then, the residual solvent amount is determined by the balance between the economical speed and quality.

The residual solvent amount used in the present invention is represented by the following expression:

Residual solvent amount (% by mass)=$\{(M-N)/N\} \times 100$ wherein M represents the mass of a web at any given point in time, and N represents the mass after drying of M at 110° C. for 3 hours.

Further, in the drying process of a cellulose ester film, the film having been peeled from the support is further dried to allow the residual solvent amount to be preferably at most 2.0% by mass, more preferably at most 1.0% by mass, still more preferably at most 0.5% by mass.

In the web drying process, a method is employed in which the web is dried while being conveyed using a roll drying apparatus with rolls arranged in a zigzag arrangement, as well as using a tenter drying apparatus stretching the web in such a manner that the width is maintained or slightly expanded in the width direction, while both ends of the web are held by clips. In the present invention, the tenter drying apparatus is specifically preferable, since the moisture stability in optical performance can be enhanced via width maintaining or stretching in a certain step after peeling from the support or in a given state where the residual solvent amount is still large. Methods of drying the web are not specifically limited, and drying is carried out with hot air, infrared radiation, heating rolls, or microwaves. Hot air is preferably used due to ease and convenience. The drying temperature is raised in a stepwise manner preferably in the range of 40-180° C., more preferably 50-160° C. Further, the drying is preferably conducted at high temperatures for a long period of time, since the effect of reducing retardation values Rt and Ro is produced.

The cellulose ester film of the present invention is preferably stretched by at least 1% both in the MD (film conveyance direction) and the TD (direction perpendicular to the conveyance direction) to ensure flatness. When a film having no in-plane retardation is produced, it is preferable that the MD stretching ratio and the TD stretching ratio be close, but the stretching ratios in the MD and the TD directions may differ. However, when the total of the MD stretching ratio and the TD stretching ratio is smaller, retardation value Rt becomes smaller. Accordingly, these stretching ratios are appropriately adjusted. Further, from the viewpoint of the effect of reducing Rt, each stretching is preferably carried out at high temperatures.

Incidentally, stretching operations may be performed, by dividing into plural stages, and biaxial stretching is preferably carried out in the casting direction and the transverse direction. Further, even when biaxial stretching is carried out, simultaneous biaxial stretching may be performed, or a stepwise manner may be employed for biaxial stretching. In this case, the stepwise manner means that, for example, stretching operations differing in stretching direction can sequentially be carried out, or it is possible that stretching in the same direction is divided into plural steps and then stretching in a different direction is added to any of the steps.

The film thickness of a cellulose ester film used for the polarizing plate protective film of the present invention is not clearly determined, since heat resistance to heat from the backlight is considered. Generally, the film thickness is preferably 10-100 μm, more preferably 10-80 μm, specifically preferably 15-60 μm, being frequently larger than that of a hard coat layer which is provided on the outmost layer of a liquid crystal display for scratch resistance.

The width of the cellulose ester film is at least 1.4 m, preferably in the range of 1.4 m-4 m for a large-sized liquid crystal display from the viewpoint of productivity.

The cellulose ester film of the present invention is suitable for a polarizing plate protective film used for a liquid crystal display of a horizontal electric field switching mode type (referred to also as IPS mode type). Retardation values Ro and Rt thereof fall within the following ranges: 0 nm≤Ro≤10 nm and −20 nm≤Rt≤20 nm.

$$Ro=(nx-ny) \times d \qquad \text{Expression (I):}$$

$$Rt=\{(nx+ny)/2-nz\} \times d \qquad \text{Expression (II):}$$

wherein nx represents the refractive index in the delayed phase axis direction in the plane of a polarizing plate protective film; ny represents the refractive index in the direction at right angles to the delayed phase axis in the plane; nz represents the refractive index in the film thickness direction; and d represents film thickness (nm).

Incidentally, retardation values Ro and Rt can be determined using an automatic birefringence meter. The determination can be made, for example, using KOBRA-21ADH (produced by Oji Scientific Instruments Co., Ltd.) under an ambience of 23° C. and 55% RH.

(Polarizing Plate)

The polarizing plate of the present invention and the liquid crystal display of the present invention employing the same will now be described.

<Polarizer>

A polarizer, being a main component of a polarizing plate, is an element which passes only light of a polarized wave plane from a predetermined direction. A typical polarizing film conventionally known is a polyvinyl alcohol-based polarizing film, which includes those prepared by dyeing a polyvinyl alcohol-based film with iodine and those dyed with a dichroic dye.

In the present invention, there is also preferably used an ethylene-modified polyvinyl alcohol film of a hot water cutting temperature of 66-73° C. formed specifically from an ethylene-modified polyvinyl alcohol featuring an ethylene unit content of 1-4 mol %, a polymerization degree of 2000-4000, and a saponification degree of 99.0-99.99 moles. Further, to reduce color spots, it is more preferable that the difference in hot water cutting temperature between 2 locations 5 cm apart in the TD direction of the film be at most 1° C. Still further, in order to reduce the color spots, it is still more preferable that the difference in hot water cutting temperature between two locations 1 cm apart in the TD direction of the film be at most 0.5° C. Furthermore, the film thickness is specifically preferably 10-50 μm for reducing the color spots.

As the ethylene-modified polyvinyl alcohol (being the ethylene-modified PVA) used in the present invention, there can be employed those which are prepared in such a manner that an ethylene-vinyl ester-based polymer, prepared by copolymerizing ethylene and a vinyl ester-based monomer, is saponified in which the vinyl ester units are changed to vinyl alcohol units. The above vinyl ester-based monomer includes vinyl formate, vinyl acetate, vinyl propionate, vinyl valerate, vinyl laurate, vinyl stearate, vinyl benzoate, vinyl pivalate, and vinyl versatate. Of these, vinyl acetate is preferably used.

The content of ethylene units (the copolymerized amount of ethylene) in the ethylene-modified PVA is 1-4 mol %, preferably 1.5-3 mol %, more preferably 2-3 mol %. The content of the ethylene units of less than 1 mol % is not preferable, since the effect of enhancing polarizing performance and durability and the effect of reducing color spots decreases. In contrast, the content of the ethylene units exceeding 4 mol % is not preferable, since the affinity of the ethylene-modified PVA with water decreases and also the uniformity of the surface of the film decreases, resulting in color spots of a polarizing film.

Further, when ethylene and a vinyl ester-based monomer are copolymerized, a copolymerizable monomer may be copolymerized, if appropriate, to the extent that no effects of the present invention are undermined (preferably at most 15 mol %, more preferably at most 5 mol %).

Examples of such a monomer copolymerizable with a vinyl ester-based monomer include olefins having a carbon number of 3-30 such as propylene, 1-butene, or isobutene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid and salts thereof; methacrylic acid esters such as methyl methacrylate, ethyl methacrylate, n-propyl methacrylate, i-propyl methacrylate, n-butyl acrylate, i-butyl acrylate, t-butyl acrylate, 2-ethylhexyl methacrylate, dodecyl methacrylate, or octadecyl methacrylate; acrylamide derivatives such as acrylamide, N-methylacrylamide, N-ethylacrylamide, N,N-dimethylacrylamide, diacetoneacrylamide, acrylamide propane sulfonic acid and salts thereof, acrylamidopropyldimethylanime and salts thereof, N-methylolacrylamide and derivatives thereof; methacrylamide derivatives such as methacrylamide, N-methylmethacrylamide, N-ethylmethacrylamide, methacrylamidopropane sulfonic acid and salts thereof, methacrylamidopropyldimethylamine and salts thereof, or N-methylolmethacrylamide and derivatives thereof; N-vinvlamides such as N-vinylformamide, N-vinylacetamide, or N-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; nitriles such as acrylonitrile or methacrylonitrile; vinyl halides such as vinyl chloride, vinylidene chloride, vinyl fluoride, or vinylidene fluoride; allyl compounds such as allyl acetate or allyl chloride; maleic acid, and salts and esters thereof; itaconic acid, and salts and esters thereof; vinylsilyl compounds such as vinylmethoxysilane; and N-vinylamides such as isopropenyl acetate, N-vinylformamide, N-vinylacetamide, or N vinylpyrrolidone.

The polymerization degree of ethylene-modified PVA constituting the polarizer and of PVA for the polarizing film is 2000-4000, preferably 2200-3500, specifically preferably 2500-3000 from the viewpoint of polarizing performance and durability. When the polymerization degree of the ethylene modified PVA is less than 2000, the polarizing performance and durability of the polarizing film are undesirably decreased. On the other hand, the polymerization degree of at most 4000 is preferable since color spots of the polarizer are hardly formed.

The polymerization degree of the ethylene-modified PVA refers to the weight average polymerization degree determined via. GPC measurement. This weight average polymerization degree is a value obtained by performing GPC measurement at 40° C. using hexafluoroisopropanol (HFIP) added with 20 mmol/liter of sodium trifluoroacetate in the moving phase employing monodispersed PMMA as a standard product.

In view of polarizing performance and durability of a polarizing film, the saponification degree of the ethylene modified PVA constituting the polarizer is preferably 99.0-99.99 mol %, more preferably 99.9-99, 99 mol %, specifically preferably 99095-99.99 mol %.

As a method of producing an ethylene-modified PVA film there can be used a film forming method employing a melt extrusion method using ethylene-modified PVA containing water; as well as, for example, using an ethylene-modified PVA solution containing ethylene-modified PVA dissolved in a solvent, a casting film forming method; a wet-type film forming method (discharging into a poor solvent); a gel film forming method (a method in which an ethylene-modified PVA solution is initially cooled and gelated, and then the solvent is removed to obtain an ethylene-modified PVA film); and methods by combination thereof. Of these, the casting film forming method and the melt extrusion film forming method are preferable to obtain a good ethylene-modified PVA film. The obtained ethylene-modified PVA film is, if appropriate, dried and thermally treated.

Solvents to dissolve the ethylene-modified PVA used during production of an ethylene-modified PVA film include, for example, dimethylsulfoxide, dimethylformamide, dimethylacetamide, N-methylpyrrolidone, ethylene glycol, glycerin, propylene glycol, diethylene glycol, triethylene glycol, tetraethylene glycol, trimethylolpropane, ethylenediamine, diethylenetriamine, glycerin, and water. These may be used individually or in combination of at least 2 types. Of these, dimethylsulfoxide and water, or a mixed solvent of glycerin and water are preferably used.

The ratio of ethylene-modified PVA contained in an ethylene-modified PVA solution or water-containing ethylene-modified PVA used for production of the ethylene-modified PVA film varies with the polymerization degree of the ethylene-modified PVA, and is preferably 20-70% by mass, more preferably 25-60% by mass, still more preferably appropriately 30-55% by mass, but most preferably 35-50% by mass. When the ratio of the ethylene-modified PVA exceeds 70% by mass, the viscosity of the ethylene-modified PVA solution or the water-containing ethylene-modified PVA becomes excessively high, whereby it becomes difficult to obtain a film without foreign substances or defects due to difficult filtration and defoaming when a film stock solution is prepared. On the other hand, when the ratio of the ethylene-modified PVA is less than 20% by mass, the viscosity of the ethylene-modified PVA solution or the water-containing ethylene-modified PVA becomes excessively low, whereby it becomes difficult to produce a PVA film at the targeted thickness. Further, if desired, plasticizers, surfactants, and dichroic dyes may be incorporated in this ethylene-modified PVA solution or water-containing ethylene-modified PVA.

During production of the ethylene-modified PVA film, it is preferable to add a polyhydric alcohol as a plasticizer. The polyhydric alcohol includes, for example, ethylene glycol, glycerin, propylene glycol, diethylene glycol, diglycerin, triethylene glycol, tetraethylene glycol, and trimethylolpropane. These may be used individually or in combination of at least two types. Of these, in view of stretch enhancement effects, diglycerin, ethylene glycol, and glycerin are preferably used.

The amount of a polyhydric alcohol added is preferably 1-30 parts by mass based on 100 parts by mass of the ethylene-modified PVA, is more preferably 3-25 parts by mass, most preferably 5-20 parts by mass. When the amount is less than 1 part by mass, dyeing properties and stretching properties may be degraded. In the case of exceeding 30 parts by mass, the ethylene-modified PVA film becomes excessively flexible, whereby handling properties may be degraded.

When the ethylene-modified PVA film is produced, a surfactant is preferably added. The type of the surfactant is not specifically limited, but an anionic or nonionic surfactant is preferable. As the anionic surfactant, preferable are anionic surfactants, for example, of a carboxylic acid type such as potassium laurate, a sulfuric acid ester type such as octyl sulfate, and a sulfonic acid type such as dodecylbenzene sulfonate. As the nonionic surfactant, preferable are nonionic surfactants, for example, of an alkyl ether type such as polyoxyethylene oleyl ether, an alkyl phenyl ether type such as polyoxyethylene octylphenyl ether, an alkyl ester type such as polyoxyethylene laurate, an alkylamine type such as polyoxyethylene laurylamino ether, an alkylamide type such as polyoxyethylene lauric acid amide, a polypropylene glycol ether type such as polyoxyethylene polyoxypropylene ether, an alkanol amide type such as oleic acid diethanolamide, and an allyl phenyl ether type such as polyoxyalkylene allyl phenyl ether. These surfactants can be used individually or in combination of at least two types.

The amount of a surfactant added is preferably 0.01-1 part by mass based on 100 parts by mass of the ethylene modified PVA, more preferably 0.02-0.5 part by mass, most preferably 0.05-0.3 part by mass. When the added amount is less than 0.01 part by mass, effects to improve film forming properties and peeling properties are hardly exhibited. In the case of exceeding 1 part by mass, the surfactant tends to be dissolved out onto the surface of the ethylene-modified PVA film to result in blocking, whereby handling properties may be degraded.

The hot water cutting temperature of an ethylene-modified PVA film is preferably 66-73° C., more preferably 68-73° C., still more preferably 70-73° C. When the hot water cutting temperature of the ethylene-modified PVA film is less than 66° C., a state, where a film starting to dissolve is stretched, is generated, whereby molecular orientation hardly occurs, leading to insufficient polarizing performance of a polarizing film. When the hot water cutting temperature exceeds 73° C., the film is hardly stretched, whereby polarizing performance of the polarizing film tends to be undesirably degraded. When the ethylene-modified PVA film is dried and thermally treated, the treatment temperature and duration are allowed to vary in order to adjust the hot water cutting temperature.

The thickness of the ethylene-modified PVA film used to prepare a polarizer is preferably 10-50 μm, more preferably 20-40 μm. When the thickness is less than 10 μm, uniform stretching is hardly carried out due to excessively low film strength, whereby color spots of a polarizing film tend to be generated. On the other hand, when the thickness exceeds 50 μm, during production of the polarizing film via uniaxial stretching of the ethylene-modified PVA film, the thickness tends to vary due to neck-in at the end portions, whereby color spots of the polarizing film tend to be undesirably enhanced.

Further, to produce a polarizing film from an ethylene-modified PVA film, for example, the ethylene-modified PVA film may be dyed, uniaxially stretched, fixed, dried, and then, if desired, thermally treated. The order of the dyeing, uniaxial stretching, and fixing is not specifically limited. Further, the uniaxial stretching may be repeated at least twice.

Dyeing can be carried out at any time such as prior to uniaxial stretching, during uniaxial stretching, or after uniaxial stretching. As dyes for dyeing, there can be used iodine-potassium iodide and the following dichroic dyes individually or in combination of at least two types Direct Black 17, 19, and 154; Direct Brown 44, 106, 195, 210, and 223; Direct Red 2, 23, 28, 31, 37, 39, 79, 81, 240, 242, and 247; Direct Blue 1, 15, 22, 78, 90, 98, 151, 168, 202, 236, 249, and 270; Direct Violet 9, 12, 51, and 98; Direct Green 1 and 85; Direct Yellow 8, 12, 44, 86, and 87; and Direct Orange 26, 39, 106, and 107. Dyeing is commonly performed by immersing a PVA film into a solution containing any of the above dyes, which may alternatively be blended into a PVA film for film forming. The treatment conditions and methods therefor are not specifically limited.

It is possible to conduct uniaxial stretching employing either a wet-type stretching method or a dry heat stretching method in heated water such as a boric acid aqueous solution (probably also in a solution containing any of the above dyes or in a fixing bath to be described later) or in an air atmosphere using the ethylene-modified PVA film after water absorption. The stretching temperature is not specifically limited. When the ethylene-modified PVA film is stretched in heated water (being wet-type stretching), the stretching temperature is preferably 30-90° C., and in contrast is preferably 50-180° C. in the case of dry heat stretching. The stretching factor of uniaxial stretching (the total stretching factor in the case of multistage uniaxial stretching) is preferably at least 4 in view of polarizing performance of a polarizing film, but is most preferably at least 5. The upper limit of the stretching factor is not specifically limited. However, the stretching factor is preferably at most 8, since uniform stretching is readily carried out. The film thickness after stretching is preferably 2-20 μm, more preferably 5-15 μm.

To strengthen adsorption of the dye onto the ethylene-modified PVA film, fixing treatment is frequently conducted. At least one of boric acid and a boron compound is commonly added in a treatment bath used for the fixing treatment Alternatively, an iodine compound may be added therein, if appropriate.

Drying of an obtained polarizer is preferably carried out at 30-150° C., more preferably at 50-150° C.

On one side of the thus-obtained polarizer, the polarizing plate protective film of the present invention is applied, and on the other side thereof, either the cellulose ester film of the present invention or another polarizing plate protective film may be applied.

Compared to the cellulose ester film, being the polarizing plate protective film of the present invention, as the polarizing plate protective film used on the other side, commercially available cellulose ester films can be used. There may be used, for example, KC8UX2M, KC4UX, KC4FR, KC5UX, KC4UY, KC8UY, KC12UR, KC8UCR-3, KC8UCR-4, KC8UCR-5, KC8UY-HA, and KC8UX-RHA (all produced by Konica Minolta Opto, Inc.), or cyclic olefin resin, acryl resin, polyester, and polycarbonate films other than the cellulose ester films.

Generally, a polarizing plate protective film applied on the side corresponding to the outmost layer (viewing side) of a liquid crystal display preferably has a hard coat layer or an anti-glare layer of a thickness of 8-20 μm. There is preferably used a polarizing plate protective film having a hard coat layer or an anti-glare layer as described, for example, in JP-A Nos. 2003-114333, 2004-203009, 2004-354599, and 2004-354828. Further, on the hard coat layer or the anti-glare layer, an antireflection layer incorporating at least a low refractive index layer is preferably provided. The low refractive index layer specifically preferably incorporates hollow fine particles.

Herein, the term "hollow fine particles" here are (1) composite particles composed of porous particles and cover layers provided on the porous particles, or (2) hollow particles having voids therein wherein the contents are filled with a solvent, a gas, or a porous substance. Incidentally, a low refractive index layer coating liquid only needs to incorporate either (1) such composite particles or (2) such hollow particles, or may incorporate both of them.

Incidentally, the hollow particles are particles having voids in the interior thereof and the voids are surrounded by particle walls. The interior of the voids is filled with a solvent, a gas, or a porous substance used in preparation processes. The average particle diameter of such inorganic fine particles is in the range of 5-300 nm, preferably 10-200 μm. Inorganic fine particles to be used are appropriately selected according to the thickness of a transparent cover film formed. This thickness preferably falls within 2/3-1/10 of the thickness of a transparent cover film such as a low refractive index layer to be formed. These inorganic particles are preferably used in a state of being dispersed in a suitable medium to form a low refractive index layer. As a dispersing medium, there are preferable water, alcohol (e.g., methanol, ethanol, and isopropanol), ketone (e.g., methyl ethyl ketone and methyl isobutyl ketone), and ketone alcohol (e.g., diacetone alcohol).

The thickness of the cover layer of composite particles or the thickness of the particle wall of hollow particles is in the range of 1-20 nm, preferably 2-15 nm. With regard to the composite particles, when the thickness of the cover layer is less than 1 nm, the particles may not completely be covered, resulting in the possibility of insufficient effects of the low refractive index. And then, when the thickness of the cover layer exceeds 20 nm, the porosity (micropore volume) of the composite particles tends to decrease, leading to the possibility of insufficient effects of the low refractive index. Further, with regard to the hollow particles, when the thickness of the particle wall is less than 1 nm, no particle shape may be kept, and even when the thickness exceeds 20 nm, insufficient effects of the refractive index may be produced.

The cover layer of the composite particles or the particle wall of the hollow particles incorporates silica as a main component. Further, the cover layer of the composite particles or the particle wall of the hollow particles may incorporate components other than silica. Specific examples thereof include $Al_2O_3$, $B_2O_3$, $TiO_2$, $ZrO_2$, $SnO_2$, $CeO_2$, $P_2O_5$, $Sb_2O_3$, $MoO_3$, $ZnO_2$, and $WO_3$. Porous particles constituting the composite particles include those composed of silica, those composed of silica and an inorganic compound other than silica, and those composed of $CaF_2$, $NaF$, $NaAlF_6$, or $MgF$. Of these, there are specifically preferable porous particles composed of a composite oxide of silica and an inorganic compound other than silica. Such an inorganic compound other than silica includes one type or at least two types of $Al_2O_3$, $B_2O_3$, $TiO_2$, $ZrO_2$, $SnO_2$, $CeO_2$, $P_2O_3$, $Sb_2O_3$ $MoO_3$, $ZnO_2$, and $WO_3$. In such porous particles, the molar ratio $MOX/SiO_2$ is in the range of 0.0001-1.0, more preferably 0.001-0.3, provided that silica is represented by $SiO_2$ and an inorganic compound ether than silica is represented by an oxide conversion (Max). Porous particles of a molar ratio $MOX/SiO_2$ of less than 0.0001 is difficult to obtain, and exhibit no electrical conductivity even when obtained. On the other hand, when the molar ratio $MOX/SiO_2$ exceeds 1.0, the ratio of silica becomes smaller, whereby no particles featuring a small micropore volume and a low refractive index may be obtained.

The micropore volume of such porous particles is in the range of 0.1-1.5 ml/g, preferably 0.2-1.5 ml/g. When the micropore volume is less than 0.1 ml/g, no particles exhibiting an adequately reduced refractive index can be prepared. In the case of exceeding 1.5 ml/g, strength of the fine particles may be decreased, resulting in the possibility of decreased strength of an obtained cover film.

Herein, the micropore volume of such porous particles can be determined via a mercury intrusion method. Further, the contents of hollow particles include a solvent, a gas, and a porous substance which are used during particle preparation. In the solvent, an unreacted substance of a particle precursor used during hollow particle preparation and a used catalyst may be contained. Then, the porous substance includes those composed of any of the compounds exemplified for the above porous particles. These contents may be those containing only a single component or a mixture of plural components.

As a production method of such inorganic fine particles, there is preferably employed a preparation method of composite oxide colloidal particles, as disclosed, for example, in paragraph Nos. [0010]-[0033] of JP-A No, 7-133105. Specifically, when composite particles are composed of silica and an inorganic compound other than silica, inorganic fine particles are produced via the following first-third processes.

First Process: Preparation of Porous Particle Precursor

In the first process, alkaline aqueous solutions of a silica raw material and of an inorganic compound raw material other than silica are separately prepared, or a mixed aqueous solution of the silica raw material and the inorganic compound raw material other than silica is prepared beforehand, and then this aqueous solution is gradually added into an alkaline aqueous solution of a pH of at least 10 while stirring, based on the composite ratio of the targeted composite oxide, to prepare a porous particle precursor.

As the silica raw material, a silicic acid salt of an alkali metal, ammonium or an organic base is used. As the silicic acid salt of an alkali metal, sodium silicate (water glass) and potassium silicate are used. The organic base includes a quaternary ammonium salt such as tetraethylammonium salt, and an amine such as monoethanolamine, diethanolamine, or triethanolamine. Herein, the silicic acid salt of ammonia or an organic base also includes an alkaline solution in which ammonia, a quaternary ammonium hydroxide, or an amine compound is added to a silicic acid liquid.

It is also preferable to use a polarizing plate protective film serving also as an optical compensating film featuring an optical anisotropic layer formed via orientation of a liquid crystal compound such as a discotic liquid crystal, rod-shaped liquid crystal, or cholesteric liquid crystal. The optical anisotropic layer is formed, for example, via the method described in JP-A No. 2003-98348.

The polarizing plate of the present invention can be structured in such a manner that a protective film is further bonded to one side of the polarizing plate and then a separate film is bonded to the opposite side. The protective film and the separate film are used to protect the polarizing plate in shipping and product inspection thereof. In this case, the protective film is bonded to protect the surface of the polarizing plate, and applied on one side thereof opposite to the other side where the polarizing plate is bonded to the liquid crystal plate. Further, the separate film is used to cover an adhesive layer bonded to the liquid crystal plate, and applied on one side of the polarizing plate to be bonded to the liquid crystal cell.

The polarizing plate of the present invention is a polarizing plate of a film thickness of 80-160 μm in which a polarizer is sandwiched between polarizing plate protective film A of a film thickness of 30-60 μm and polarizing plate protective film B of a film thickness of 30-60 μm serving also as a retardation plate. The stiffness (ST) of the polarizing plate at 23° C. and 55% RH is preferably in the range of 20-80 g.

Herein, a determination method of the stiffness of a polarizing plate at 23° C. and 55% RH is as follows.

<Stiffness Determination>

A polarizing plate is cut out to a size measuring 35 mm in width and 105 mm in length, and both ends thereof are fixed with a double-sided adhesive tape of a width of 5 mm to prepare a ring at the point of a length of 100 mm of the film. The portion, whose both ends were bonded, was fixed face down on a bench and vertically pushed in from the above of the ring. Then, the load (g), when the ring was pushed in at a depth of 10 mm, was read off using a load cell as the stiffness. In this case, an ambience for the determination was kept at 23° C. and 55% RH, (Liquid Crystal Display)

By incorporating the polarizing plate of the present invention in a commercially available VA mode, IPS (In Plane Switching) mode type liquid crystal image display, the liquid crystal display of the present invention featuring excellent visibility and an enlarged viewing angel can be produced. In the present invention, the horizontal electric field switching mode also includes a fringe electric field switching (FFS Fringe-Field Switching) mode, which can be incorporated in the polarizing plate of the present invention similarly to the IPS mode. Then, the liquid crystal display of the present invention with similar effects can be produced.

When provided in a liquid crystal display, the polarizing plate protective film of the present invention is arranged between a driving liquid crystal cell and the backlight, and also the polarizing plate protective film having a hard coat layer of the present invention is arranged so as to be located on the backlight side. The effects of the present invention are expressed via such arrangement. When a luminance enhancing film making use of polarized light is used between the polarizing plate protective film of the present invention and the backlight, the present invention produces maximal effects. The luminance enhancing film includes REEF (luminance enhancing film produced by Sumitomo 3M Ltd.).

EXAMPLES

The present invention will now specifically be described with reference to examples that by no means limit the scope of the present invention.

(Synthesis of Polymers X and Y)

Block polymerization was carried out based on the polymerization method described in JP-A No. 2000-344823. Namely, while methyl methacrylate and ruthenocene were introduced into a flask fitted with a stirrer, a nitrogen gas introducing tube, a thermometer, a feeding inlet, and a refluxing cooling tube, the contents were heated to 70° C. Subsequently, a half of β-mercaptopropionic acid described below, having fully been replaced with nitrogen gas, was added into the flask while stirring. After addition of β-mercaptopropionic acid, the contents being stirred in the flask were kept at 70° C. to be polymerized for 2 hours. Further, the remaining half of β-mercaptopropionic acid, having been replaced with nitrogen gas, was additionally added to further carry out polymerization for 4 hours while the temperature of the stirred contents was kept at 70° C. The temperature of the reaction product was returned to room temperature, and 20 parts by mass of a tetrahydrofuran solution containing benzoquinone of 5% by mass was added to the reaction product to terminate the polymerization. While the resulting polymerized product was gradually heated to 80° C. under reduced pressure using an evaporator, tetrahydrofuran, the residual monomer, and residual thiol compound were removed to obtain polymer AC11. The weight average molecular weight thereof was 1000.

| Methyl methacrylate | 100 parts by mass |
| Ruthenocene (metal catalyst) | 0.05 part by mass |
| β-mercaptopropionic acid | 12 parts by mass |

Further, the amount of a reaction terminating agent and the adding timing were adjusted to obtain AC9-10, 12, and 13. Still further, with reference to the method described in JP-A No. 2003-12859, polymer AC1-8 were synthesized. The prepared samples are listed in Tables 1 and 2.

TABLE 1

$(HEA)_{Xa} - (MMA)_{Xb}$

| Compound | Xa: Molar Composition Ratio | Xb: Molar Composition Ratio | Mw |
|---|---|---|---|
| AC1 | 1 | 99 | 4000 |
| AC2 | 5 | 95 | 5000 |
| AC3 | 10 | 90 | 8000 |
| AC4 | 20 | 80 | 12000 |
| AC5 | 40 | 60 | 18000 |
| AC6 | 40 | 60 | 25000 |
| AC7 | 50 | 50 | 30000 |
| AC8 | 50 | 50 | 32000 |

MMA: methyl methacrylate
HEA: 2-hydroxyethyl acrylate

TABLE 2

| AC9 | PMMA | 400 |
| AC10 | PMMA | 500 |
| AC11 | PMMA | 1000 |
| AC12 | PMMA | 2000 |
| AC13 | PMMA | 3000 |
| AC14 | PMMA | 3200 |

(Polymerization of Polyester)

There are attached a stirrer, a nitrogen gas introducing tube, a thermometer, and a water removing tube to a three-necked flask. The water removing tube has a fractionating tube and further ahead thereof a vertex thermometer and a cooling tube, as well as a water receiver with a scale (ml) below the cooling tube. An exhaust tube is provided on the upper side of the receiver. The flask is charged with 186 g of ethylene glycol and 236 g of succinic acid. While nitrogen gas is slowly passed, the internal temperature is raised to 80-90° C. to initiate stirring. Then, the temperature is raised to 150-160° C. over 1 hour. Water is removed so that the vertex temperature does not exceed 100° C. (namely, so that only water is distilled away to the outside of the system with no glycol distilled out), and further the temperature is raised to 190-200° C. When 72 g of water is distilled out, the internal temperature is decreased to 110-120° C., and 120 g of acetic acid is added to raise the temperature to 150-160 CC again. Further, when 36 g of water is distilled out, the internal temperature was decreased to 110-120° C. and thereafter to 80° C. Then, depositing was carried out with acetone, and the deposit was filtered and isolated to obtain K1. The molecular weight of K1 was determined via GPC, and then the weight average molecular weight thereof was 434.

(Polymerization of K2-11)

In the same manner as for K1, a dihydric alcohol and a dibasic carboxylic acid combined as listed in Tables 3 and 4 are heated while stirring. When water is distilled out, the internal temperature is decreased. Then, a monoalcohol or a monocarboxylic acid is added and the temperature is again raised while stirring. Further, when water is distilled out, the internal temperature is decreased, and then depositing is carried out with acetone. The deposit is filtered and isolated to obtain K2-11. Incidentally, each of the molecular weights was controlled by varying the amount of water distilled out. For K5 and K7, each of the mixing ratios of alcohols to carboxylic acids of 2 types each was set to 1:1. The weight average molecular weights of the thus obtained polymers are as follows: herein, the figures in the parentheses represent the weight average molecular weights; K2(800), K3(234), K4(3000), K5(6000), K6(10000), K7(11000), K8(234), K9(1000), 1(10(8000), and K11(10000). The prepared samples are listed in Tables 3 and 4.

TABLE 3

$B_1-(G-A-)wG-B_1$

| Compound | B1 | G | A | Mw | |
|---|---|---|---|---|---|
| K1 | $CH_3COO-$ | $-C_2H_4-O-$ | $-CO-C_2H_4-COO-$ | 430 | |
| K2 | $CH_3COO-$ | $-C_2H_4-O-$ | $-CO-C_2H_4-COO-$ | 800 | |
| K3 | $HCOO-$ | $-C_2H_4-O-$ | $-CO-COO-$ | 230 | |
| K4 | $C_7H_{15}COO-$ | $-C_2H_4-O-$ | $-CO-C_2H_4-COO-$ | 3000 | |
| K5 | $CH_3COO-$ | $-C_2H_4-O-$ $-C_4H_8-O-$ | $-CO-C_2H_4-COO-$ $-CO-C_4H_8-COO-$ | 6000 | *mixing ratio1:1 |
| K6 | $C_{11}H_{23}COO-$ | $-C_{12}H_{24}-O-$ | $-CO-C_{10}H_{20}-COO-$ | 10000 | |
| K7 | $C_{11}H_{23}COO-$ | $-C_2H_4-O-$ $-C_{12}H_{24}-O-$ | $-CO-C_2H_4-COO-$ $-CO-C_{10}H_{20}-COO-$ | 11000 | *mixing ratio1:1 |

TABLE 4

$B_2-(A-G-)zA-B_2$

| Compound | B2 | A | G | Mw |
|---|---|---|---|---|
| K8 | $CH_3O-$ | $-CO-COO-$ | $-C_2H_4-O-$ | 230 |
| K9 | $C_2H_5O-$ | $-CO-C_2H_4-COO-$ | $-C_2H_4-O-$ | 1000 |
| K10 | $C_2H_5O-$ | $-CO-COO-$ | $-C_4H_8-O-$ | 8000 |
| K11 | $C_2H_5O-$ | $-CO-COO-$ | $-C_2H_4-O-$ | 10000 |

(Production of Cellulose Ester Film S1)
<Dope Composition>

| | |
|---|---|
| Cellulose triacetate (acetylation degree: 61.5%) | 100 pats by mass |
| 2-(2'-hydroxy-3',5'-di-t-butylphenyl)benzotriazole | 2 parts by mass |
| AC1 (polymer X) | 30 parts by mass |
| Methylene chloride | 475 parts by mass |
| Ethanol | 50 parts by mass |

The dope composition was placed in a sealed container and heated to 70° C., and then cellulose triacetate (TAC) was thoroughly dissolved while stirring to obtain a dope. The duration required for dissolution was 4 hours. The dope composition was filtered and then uniformly cast onto a stainless steel band support of 22° C. at a dope temperature of using a belt casting apparatus. The temperature of the stainless steel band support was 20° C.

Thereafter, the dope was peeled from the stainless steel band support after dried until becoming peelable. At this time, the residual solvent amount of the dope was 25%. The duration required from dope casting through peeling was 3 minutes. After peeling from the stainless steel band support, while stretching was carried out by a factor of 1.01 in the width direction, drying was conducted at 120° C. and width holding was released. Using a large number of rolls, while conveyance was carried out, drying was performed at 120° C., and then terminated in a drying zone of 135° C. Both ends of the resulting film were subjected to knurling processing of 10 mm wide and 5 μm high to obtain cellulose ester film S1 of a film thickness of 40 μm. The film width and the winding length were set to 1300 mm and 3000 m, respectively. With regard to the winding tension, the initial tension and the final winding tension were set to 150 N/1300 mm and 100 N/1300 mm, respectively (Production of Cellulose Ester Films S2-S35)

Cellulose ester films S2-S35 were prepared in the same manner as in preparation of cellulose ester film S1 except that AC1 was changed to polymer X and the added amount thereof as listed in Table 5, and also polymer Y or a polyester was added to some of the films to change the film thicknesses as described in Tables 5 and 6.

TABLE 5

| Cellulose Ester Film No. | Surface Processing | Polymer X *1 | Polymer X % by Mass | Polymer Y *1 | Polymer Y % by Mass | Polyester *1 | Polyester % by Mass | Film Thickness (μm) | Flatness | Rt (nm) | Ro (nm) | Rt Stability | Dimensional Stability | |
|---|---|---|---|---|---|---|---|---|---|---|---|---|---|---|
| S1 | CHC | AC1 | 30 | — | — | — | — | 40 | B | −20 | 2 | B | C | ** |
| S2 | CHC | AC2 | 20 | — | — | — | — | 40 | B | −10 | 1 | A | B | ** |
| S3 | CHC | AC3 | 15 | — | — | — | — | 40 | B | −5 | 0 | A | B | ** |
| S4 | CHC | AC3 | 15 | — | — | — | — | 80 | A | −5 | 0 | B | B | ** |

TABLE 5-continued

| Cellulose Ester Film No. | Surface Processing | Polymer X *1 | Polymer X % by Mass | Polymer Y *1 | Polymer Y % by Mass | Polyester *1 | Polyester % by Mass | Film Thickness (μm) | Flatness | Rt (nm) | Ro (nm) | Rt Stability | Dimensional Stability | |
|---|---|---|---|---|---|---|---|---|---|---|---|---|---|---|
| S5 | CHC | AC4 | 10 | — | — | | | 40 | B | 0 | 0 | A | B | ** |
| S6 | CHC | AC4 | 10 | — | — | | | 50 | A | 0 | 0 | A | B | ** |
| S7 | CHC | AC5 | 10 | — | — | | | 40 | B | 0 | 0 | A | B | ** |
| S8 | CHC | AC6 | 5 | — | — | | | 40 | B | 5 | 0 | A | B | ** |
| S9 | CHC | AC7 | 5 | — | — | | | 40 | B | 5 | 0 | A | B | ** |
| S10 | CHC | AC8 | 15 | — | — | | | 40 | B | −5 | 1 | B | C | ** |
| S12 | CHC | AC3 | 15 | AC10 | 5 | | | 80 | A | −5 | 0 | B | A | ** |
| S13 | CHC | AC3 | 10 | AC11 | 10 | | | 25 | B | −5 | 0 | A | A | ** |
| S14 | CHC | AC3 | 10 | AC11 | 5 | | | 40 | B | 0 | 0 | A | A | ** |
| S15 | CHC | AC3 | 10 | AC12 | 10 | | | 80 | A | −5 | 0 | B | A | ** |
| S16 | AG | AC4 | 10 | AC12 | 5 | | | 40 | B | −10 | 1 | A | A | ** |
| S17 | AG | AC4 | 10 | AC13 | 5 | | | 50 | A | −5 | 0 | A | A | ** |
| S18 | CHC/AR | AC4 | 15 | AC14 | 5 | | | 40 | B | −10 | 1 | B | C | ** |

*1: Compound,
** example

TABLE 6

| Cellulose Ester Film No. | Surface Processing | Polymer X *1 | Polymer X % by Mass | Polymer Y *1 | Polymer Y % by Mass | Polyester *1 | Polyester % by Mass | Film Thickness (μm) | Flatness | Rt (nm) | Ro (nm) | Rt Stability | *2 | |
|---|---|---|---|---|---|---|---|---|---|---|---|---|---|---|
| S19 | CHC | AC3 | 5 | — | — | K1 | 30 | 40 | B | −15 | 2 | A | A | ** |
| S20 | CHC | AC3 | 10 | — | — | K2 | 10 | 80 | A | −10 | 1 | B | A | ** |
| S21 | CHC | AC3 | 5 | — | — | K2 | 20 | 40 | B | −10 | 1 | A | B | ** |
| S22 | CHC | AC3 | 10 | — | — | K3 | 5 | 40 | B | −5 | 0 | A | B | ** |
| S23 | CHC | AC3 | 5 | — | — | K4 | 10 | 80 | A | 0 | 0 | B | A | ** |
| S24 | CHC | AC3 | 10 | — | — | K5 | 10 | 40 | B | −5 | 1 | A | B | ** |
| S25 | CHC | AC3 | 10 | — | — | K6 | 5 | 40 | B | 0 | 0 | A | B | ** |
| S26 | CHC | AC3 | 15 | — | — | K7 | 5 | 80 | A | −5 | 0 | B | A | ** |
| S27 | CHC | AC4 | 15 | — | — | K8 | 5 | 80 | A | 0 | 0 | B | A | ** |
| S28 | CHC | AC4 | 10 | — | — | K9 | 10 | 80 | A | −5 | 0 | B | A | ** |
| S29 | CHC | AC4 | 5 | — | — | K9 | 15 | 40 | B | 0 | 0 | A | B | ** |
| S30 | CHC | AC4 | 10 | — | — | K10 | 5 | 80 | A | 0 | 0 | B | B | ** |
| S31 | CHC | AC4 | 15 | — | — | K11 | 5 | 40 | B | 0 | 0 | A | B | ** |
| S32 | not applied | AC3 | 10 | AC11 | 5 | | | 40 | B | 0 | 0 | C | F | Comp. |
| S33 | not applied | AC3 | 10 | AC12 | 10 | | | 80 | A | −5 | 0 | D | E | Comp. |
| S34 | not applied | AC3 | 5 | — | — | K2 | 20 | 40 | B | −10 | 1 | C | F | Comp. |
| S35 | not applied | AC4 | 10 | — | — | K9 | 10 | 80 | A | −5 | 0 | D | E | Comp. |

*1: Compound,
*2: Dimensional Stability,
** example,
Comp.: comparative example

<Production of Cellulose Ester Films Having a Hard Coat Layer and a Back Coat Layer>

Onto cellulose ester films S1-15 and S18-31, using a microgravure coater, a hard coat layer coating liquid was coated, which was prepared via filtration of a coating liquid used for a hard coat layer described below using a polypropylene filter of a hole diameter of 0.4 μm. After being dried at 90° C., the resulting coated layer was cured using a UV lamp wherein the illuminance of the irradiation section was 100 mW/cm² and the irradiation amount was 0.1 J/cm², followed by formation of a hard coat layer of a dry film thickness of 10 μm to produce a hard coat film.

(Hard Coat Layer Coating Liquid)

The following materials were stirred and mixed to prepare a hard coat layer coating liquid.

| | |
|---|---|
| Acrylic monomer: KAYARAD DPHA (dipentaerythritol hexaacrylate, produced by Nihon Kayaku Co., Ltd.) | 220 parts by mass |
| IRUGACURE 184 (produced by Ciba Specialty Chemicals, Ltd.) | 20 parts by mass |

-continued

| Propylene glycol monomethyl ether | 110 parts by mass |
| Ethyl acetate | 110 parts by mass |

Further, the back coat layer composition described below was coated using an extrusion coater at a wet film thickness of 10 μm, followed by drying at 85° C. and winding to provide a back coat layer.

(Back Coat Layer Composition)

| Acetone | 54 parts by mass |
| Methyl ethyl ketone | 24 parts by mass |
| Methanol | 22 parts by mass |
| Diacetyl cellulose | 0.6 part by mass |
| Acetone dispersion of superfine particle silica of 2% (AEROSIL 200V produced by Nihon Aerosil Co., Ltd.) | 0.2 part by mass |

Hard coat films H1-15 and H18-31, wherein a hard coat layer for a cellulose ester film was coated, were obtained via the above processes.

Further, the following antireflection layer was coated on H18.

<Antireflection Layer Coating>

Onto hard coat film H18 produced above, antireflection layers were coated in a sequential order of a high refractive index layer and then a low refractive index layer to produce an antireflection film.

(High Refractive Index Layer)

The high refractive index layer coating composition described below was coated onto the hard coat film using an extrusion coater, dried at 80° C., for 1 minute, and then cured via UV irradiation at 0.1 J/cm², followed by thermal curing at 100° C. for 1 minute to provide a high refractive index layer at a thickness of 78 nm. The refractive index of this high refractive index layer was 1.62.

(High Refractive Index Layer Coating Composition)

| Isopropyl alcohol solution of metal oxide fine particles (solid content: 20%; and particle diameter of ITO particles: 5 nm) | 55 parts by mass |
| Metal compound: Ti(OBu)$_4$ (tetra-n-butoxy titanium) | 1.3 parts by mass |
| Ionizing radiation curable resin: dipentaerythritol hexaacrylate | 3.2 parts by mass |
| Photopolymerization initiator: IRUGACURE 184 (produced by Ciba Specialty Chemicals, Ltd.) | 0.8 part by mass |
| 10% propylene glycol monomethyl ether liquid of straight-chained dimethyl silicone-EO block copolymer (FZ-2207, produced by Nippon Unicar Co., Ltd.) | 1.5 parts by mass |
| Propylene glycol monomethyl ether | 120 parts by mass |
| Isopropyl alcohol | 240 parts by mass |
| Methyl ethyl ketone | 40 parts by mass |

(Low Refractive Index Layer)

Onto the above high refractive index layer, the low refractive index layer coating composition described below was coated using an extrusion coater, dried at 100° C. for 1 minute, cured via UV irradiation at 0.1 J/cm², and then thermally cured at 120° C. for 5 minutes to provide a low refractive index layer at a thickness of 95 nm. Thus, an antireflection film was produced. Herein, the refractive index of this low refractive index layer was 1.37.

(Preparation of Low Refractive Index Layer Coating Composition)

<Preparation of Tetraethoxysilane Hydrolysate A>

Hydrolysate A was prepared in such a manner that 289 g of tetraethoxysilane and 553 g of ethanol were mixed, and the resulting mixture, along with 157 g of a 0.15% acetic acid aqueous solution, was stirred for 30 hours in a water bath at 25° C.

| Tetraethoxysilane hydrolysate A | 110 parts by mass |
| Hollow silica-based fine particles (P-2 described below) | 30 parts by mass |
| KBM503 (silane coupling agent, produced by Shin-Etsu Chemical Co., Ltd,) | 4 parts by mass |
| 10% propylene glycol monomethyl ether liquid of straight-chained dimethyl silicone-EO block copolymer (FZ-2207, produced by Nippon Unicar Co., Ltd.) | 3 parts by mass |
| Propylene glycol monomethyl ether | 400 parts by mass |
| Isopropyl alcohol | 400 parts by mass |

<Preparation of Hollow Silica-based Fine Particle P-2>

A mixture of 100 g of a silica sol of an average particle diameter of 5 nm and a $SiO_2$ concentration of 20% by mass and 1900 g of purified water was heated to 80 The pH of this mother reaction liquid was 10.5. There were simultaneously added, to the mother liquid, 9000 g of a 0.98% by mass sodium silicate aqueous solution as $SiO_2$ and 9000 g of a 1.02% by mass sodium aluminate aqueous solution as $Al_2O_3$. During the above addition, the temperature of the reaction liquid was kept at 80° C. The pH of the reaction liquid increased to 12.5 immediately after the addition, and thereafter remained nearly the same. After completion of the addition, the reaction liquid was cooled to room temperature and washed with an ultrafiltration membrane to prepare a $SiO_2.Al_2O_3$ core particle dispersion of a solid concentration of 20% by mass (Process (a)).

Then, 1700 g of water was added to 500 g of this core particle dispersion, followed by being heated to 98° C. While this temperature remained the same, 3000 g of silicic acid liquid (at a $SiO_2$ concentration of 3.5% by mass), having been prepared via dealkalization of an sodium silicate aqueous solution using a cation exchange resin, was added to prepare a core particle dispersion forming a first silica cover layer (Process (b)).

Subsequently, 1125 g of purified water was added to 500 g of the core particle dispersion, which formed the first silica cover layer, resulting in a solid concentration of 13% by mass via washing with an ultrafiltration membrane. Further, dealuminization was performed by allowing the pH to be 1.0 by dripping concentrated hydrochloric acid (35.5%). Then, while 10 l of a hydrochloric acid aqueous solution of a pH of 3 and 5 l of purified water were added, aluminum salts dissolved were separated using an ultrafiltration membrane to prepare a porous $SiO_2.Al_2O_3$ particle dispersion, in which some of the constituent components of the core particles which formed the first silica cover layer were removed (Process (c)).

A mixed liquid of 1500 g of the above porous particle dispersion, 500 g of purified water, 1750 g of ethanol, and 626 g of 28% ammonia water was heated to 35° C., and then 104 g of ethyl silicate ($SiO_2$: 28% by mass) was added. Thereafter, the surface of the porous particles, which had formed the first silica cover layer, was coated with a hydrolysis polycondensate of ethyl silicate to form a second silica cover layer. Subsequently, using an ultrafiltration membrane, hollow silica-based fine particle (P-2) of a solid concentration of 20% by mass in which the solvent was replaced with ethanol was prepared.

The thickness of the first silica cover layer of the above hollow silica-based particle was 3 nm, and the average particle diameter was 47 nm. $MO_x/SiO_2$ (mol ratio) was 0.0017, and the refractive index was 1,28. Herein, the average particle diameter was determined via a dynamic light scattering method.

(Thermal Treatment)

A film coated with an antireflection layer produced was thermally treated in a thermal treatment chamber at 80° C. for 4 days to obtain H18 coated with the antireflection layer.

Further, a hard coat layer having an AG function, as described below, was coated on cellulose ester films S16 and S17 instead of the above hard coat layer.

<Production of Hard Coat Film Having AG Function>

For a transparent resin, 100 parts of zirconium-containing UV acrylate resin of a refractive index of 1.67 (trade name: KZ7391; and solid concentration: CA; produced by JSR. Corp.) and 18 parts of dipentaerythritol hexaacrylate of a refractive index of 1.51 were mixed to obtain a transparent resin solution of a sold concentration of 51% featuring a refractive index of 1060 when cured. There were added, to 100 parts of this transparent resin solution, 1 part of 2-hydroxy-2-methylpropiophenone as a photopolymerization initiator; 3.6 parts of silicone resin made bowl-shaped resin fine particles (height: 1.7 μm; opening diameter: 1.8 μm; and thickness: 0.35 μm) of a refractive index of 1.42 and an average particle diameter of 2.4 μm, as well as 5.4 parts of silicone resin-made spherical resin fine particles of a refractive index of 1.42 and an average particle diameter of 2.4 μm as resin fine particles; and 41 parts of methyl isobutyl ketone as a solvent, followed by dispersion using a sand mill for 30 minutes to obtain a coating medium. The thus-obtained coating medium was coated onto a transparent substrate composed of TAG of a thickness of 80 pa and a transmittance of 94% via a reverse coating method. After drying at 100° C. for 2 minutes, UV' irradiation was carried out using one 120 W/cm light-concentrating-type high-pressure mercury lamp (irradiation distance: 10 cm; and irradiation duration: 30 seconds) to cure the coated film. Thus, hard coat films H16 and 17 with an anti-glare layer of a thickness of 108 μm featuring an AG function were produced.

[Evaluation]

With respect to cellulose ester films S1-S35 obtained, the following evaluations were conducted. The results were shown in Tables 5 and 6.

(Flatness)

Each of the samples was cut out to a size of 90 cm wide and 100 cm long. Five 50 W fluorescent tubes were fixed side-by-side at a height of 1.5 m so that a sample bench is illuminated at an angle of 45°. Each of the film samples was placed on the sample bench, and then unevenness thereof to be seen via reflection on the film surface was visually observed to make evaluation as follows. This method made it possible to evaluate "unbalanced tension", "wrinkles", and "curling".

A: The five fluorescent tubes all appeared straight.

B: The fluorescent tubes partially appeared curved to a small extent.

C: The fluorescent tubes entirely appeared curved to a small extent.

D: The fluorescent tubes appeared undulated to a large extent.

(Determination of Ro and Rt)

Using an Abbe refractive index meter (4T), the average refractive index of a cellulose ester film was determined. Further, the film thickness was determined using a commercially available micrometer.

With regard to a film treated under an ambience of 23° C. and 55% RH for 24 hours, retardation thereof was determined under the same ambience at a wavelength of 590 nm using automatic birefringence meter KOBRA-21ADH (produced by Oji Scientific Instruments Co., Ltd.). The above average refractive index and the film thickness were put into the following expressions to obtain the in-plane retardation (Ro) and the retardation in the thickness direction (Rt).

$$Ro = (nx - ny) \times d \qquad \text{Expression (I):}$$

$$Rt = \{(nx + ny)/2nz\} \times d \qquad \text{Expression (II):}$$

wherein nx represents the refractive index in the delayed phase axis direction in the plane of a cellulose ester film; ny represents the refractive index in the direction at right angles to the delayed phase axis in the plane; nz represents the refractive index in the film thickness direction; and d represents film thickness (nm).

(Rt Stability)

A produced cellulose ester film was treated at 23° C. and 80% RH for 10 hours, and thereafter Pt was determined. Further, this film was treated at 23° C. and 20% RH for 10 hours to determine Rt. Four-grade evaluation was made based on the following criteria.

$$\Delta Rt \text{ (nm)} = Rt(23° C., 80\% RH) - Rt(23° C., 20\% RH)$$

A: ΔRt was less than 10 nm.
B: ΔRt was 10-less than 15 nm.
C: ΔRt was 15-less than 20 nm.
D: ΔRt was at least 20 nm.

(Dimensional Stability)

A produced cellulose ester film was marked with a cross at 2 locations each in the film conveyance direction (MD direction) and in the direction at right angles thereto (TD direction), followed by treatment at 80° C. and 90% RH for 120 hours to measure the distance between the marks (crosses) prior to and after the treatment using an optical microscope. Five-grade evaluation was made based on the following criteria.

$$\text{Dimensional Change Rate (\%)} = [(a1 - a2)/a1] \times 100$$

wherein a1 represents the distance prior to thermal treatment, and a2 represents the distance after thermal treatment.

A: The dimensional change rate was less than 0.1%
B: The dimensional change rate was 0.1%-less than 0.5%.
C: The dimensional change rate was 0.5%-less than 1.0%.
D: The dimensional change rate was 1.0%-less than 1.5%.
E: The dimensional change rate was 1.5%-less than
F. The dimensional change rate was 2,0%-less than 3.0%.
G: The dimensional change rate was 3.0%-5.0% or more The tables shows that the cellulose ester film of the present invention exhibits excellent flatness, Rt stability, and dimensional stability, compared to the comparative examples.

(Production of Polarizing Plates 1-31)

Above cellulose ester films H1-H31 were alkali treated with a 2.5 mol/l sodium hydroxide aqueous solution of 40° C. for 60 seconds, and washed with water for 3 minutes for formation of a saponified layer. Thus, an alkali treated film was obtained. Subsequently, this film was bonded to one side of a polarizer using a 5% completely saponified polyvinyl alcohol aqueous solution as an adhesive, and KC4UY (produced by Konica Minolta Opt, Inc.) was bonded to the other side thereof, followed by drying to produce polarizing plates 1-11 and 16-31.

Further, on the other side describe above, KC4FR (produced by Konica Minolta Opt, Inc.) or S14, being the polarizing plate of the present invention, was bonded instead of KC4UY to produce each of polarizing plates 12, 13, 14, and 15.

(Production of Polarizing Plates 32-38)

Via combinations of the cellulose ester films listed in Table 7, films were bonded to a polarizer in the same manner as in production of polarizing plates 1-31 to produce polarizing plates 32-38. Herein, KC8UX-HA (Ro: 1.0 nm and RT: 48 nm, produced by Konica Minolta Opt, Inc.) was applied to one side of polarizing plate 36, and KC8UX-H (Ro: 1.2 nm and RT: 49 nm, produced by Konica Minolta Opt, Inc.) and KC8UY-HA (Ro: 1.0 nm and RT: 55 nm, produced by Konica Minolta Opt, Inc.) were applied to one side of 37 and 38, respectively.

With regard to polarizing plates 1-38 obtained, the following evaluations were made.

(Polarizing Plate Deterioration)

A polarizing plate produced above was treated at 80° C. and 90% RH for 120 hours, and transmittance prior to and after the treatment was determined. Fine-grade evaluation was made based on the following criteria.

Transmittance difference $\Delta T$ (%)=$Td$(transmittance after high temperature and humidity treatment)−$T0$(transmittance before high temperature and humidity treatment)

A: $\Delta T$ was less than 1%.
B: $\Delta T$ was 1%-less than 5%.
C: $\Delta T$ was 5%-less than 10%.
D: $\Delta T$ was 10%-less than 15%.
E: $\Delta T$ was at least 15%.

(Polarizing Plate Dimensional Change)

Each of the produced polarizing plates was marked with a cross at 2 locations in the absorption axis direction of a polarizer, and allowed to be leave at 80° C. and 90% RH for 120 hours. The distance between the marks (crosses) prior to and after the treatment was measured using an optical microscope. Five-grade evaluation was made based on the following criteria.

Dimensional change rate (%)=[($a1$−$a2$)/$a1$]×100 wherein a1 represents the distance prior to thermal treatment and a2 represents the distance after thermal treatment.

A: The dimensional change rate was less than 0.1%.
B: The dimensional change rate was 0.1%-less than 0.5%.
C: The dimensional change rate was 0.5%-less than 1.0%.
D: The dimensional change rate was 1.0%-less than 1.5%.
E: The dimensional change rate was 1.5%-less than 2.0%.
F: The dimensional change rate was 2.0%-less than 3.0%.
G: The dimensional change rate was 3.0%-5.0% or more.

(Viewing Angle Variation)

<Production of Liquid Crystal Display>

A liquid crystal panel used to determine a viewing angle was produced as described below. Characteristics for a liquid crystal display were evaluated.

Only the polarizing plate originally bonded to the rear side (backlight side) of 32 inch display W32-L7000 (produced by Hitachi, Ltd.) was removed. Each of above-produced polarizing plates 1-38 was bonded to the glass of the liquid crystal cell so as to be located on the backlight side. In this case, the polarizing plate was bonded in such a manner that the absorption axis thereof was directed in the same direction as that of the originally bonded polarizing plate. Thus, liquid crystal displays 1-38 were produced.

Herein, with regard to polarizing plates 14, 15, and 35, cellulose ester film S14 of the present invention was bonded so as to face the glass cell as shown in Table 7.

Using liquid crystal displays 1-38 produced above, the following evaluations were carried out.

The viewing angle of the liquid crystal display was determined under an ambience of 23° C. and 55% RH using EZ-Contrast160D (produced by Eldim SA). Subsequently, the above polarizing plate was treated at 60° C. and 90% RH for 500 hours and the same determination was carried out. Further, the above polarizing plate was treated at 60° C. and 90% RH for 1000 hours and the same determination was conducted. Three-grade evaluation was made based on the following criteria, A: No viewing angle variation was noted.
C: Some viewing angle variation was noted.
D: Very large viewing angle variation was noted.

[CM (Corner Mottle)]

In the same manner as in viewing angle evaluation described above, a polarizing plate was bonded to produce liquid crystal displays 1-38, which were treated at 60° C. for 300 hours and thereafter the ambience was returned to 23° C. and 55% RH for further treatment. Then, the power supply was switched on to light the backlight. After the elapse of 2 hours, light leakage during black displaying was visually observed to make evaluation based on the following criteria.

A: No light leakage was noted at all.
B: Weak light leakage was noted at 1 or 2 locations
C: Strong light leakage was noted at 1 or 2 locations.
D: Strong light leakage was noted at 3 locations or more.

The final results are shown in Table 7.

TABLE 7

| Polarizing Plate No. | Polarizing Plate Structure | | | Polarizing Plate | | | | | |
|---|---|---|---|---|---|---|---|---|---|
| | Backlight Side Film | Polarizer | Cell Side Film | Deterioration | Dimensional Change | CM (Corner Mottle) | Viewing Angle Variation | | |
| | | | | | | | (500 h) | (1000 h) | |
| 1 | H1 | — | 4UY | B | C | C | B | C | example |
| 2 | H2 | — | 4UY | A | A | B | A | B | example |
| 3 | H3 | — | 4UY | A | A | B | A | B | example |
| 4 | H4 | — | 4UY | A | A | B | A | B | example |
| 5 | H5 | — | 4UY | A | A | B | A | B | example |
| 6 | H6 | — | 4UY | A | A | B | A | B | example |
| 7 | H7 | — | 4UY | A | A | B | A | B | example |
| 8 | H8 | — | 4UY | A | A | B | A | B | example |
| 9 | H9 | — | 4UY | A | A | B | A | B | example |

TABLE 7-continued

| Polarizing Plate No. | Polarizing Plate Structure Backlight Side Film | Polarizer | Cell Side Film | Polarizing Plate Deterioration | Dimensional Change | CM (Corner Mottle) | Viewing Angle Variation (500 h) | (1000 h) | |
|---|---|---|---|---|---|---|---|---|---|
| 10 | H10 | — | 4UY | C | C | C | B | C | example |
| 11 | H11 | — | 4UY | C | C | C | B | C | example |
| 12 | H12 | — | 4FR | B | A | B | A | A | example |
| 13 | H13 | — | 4FR | B | A | B | A | A | example |
| 14 | H14 | — | S14 | A | A | B | A | A | example |
| 15 | H15 | — | S14 | B | A | B | A | A | example |
| 16 | H16 | — | 4UY | A | A | B | A | A | example |
| 17 | H17 | — | 4UY | A | A | B | A | A | example |
| 18 | H18 | — | 4UY | C | C | C | C | C | example |
| 19 | H19 | — | 4UY | B | A | B | A | B | example |
| 20 | H20 | — | 4UY | A | A | B | A | A | example |
| 21 | H21 | — | 4UY | B | A | B | A | B | example |
| 22 | H22 | — | 4UY | A | A | B | A | B | example |
| 23 | H23 | — | 4UY | A | A | B | A | A | example |
| 24 | H24 | — | 4UY | B | A | B | A | B | example |
| 25 | H25 | — | 4UY | A | A | B | A | B | example |
| 26 | H26 | — | 4UY | A | A | B | A | A | example |
| 27 | H27 | — | 4UY | A | A | B | A | A | example |
| 28 | H28 | — | 4UY | A | A | B | A | A | example |
| 29 | H29 | — | 4UY | B | A | B | A | B | example |
| 30 | H30 | — | 4UY | A | A | B | A | B | example |
| 31 | H31 | — | 4UY | A | A | B | A | B | example |
| 32 | S32 | — | 4UY | D | D | D | C | D | Comp. |
| 33 | S33 | — | 4UY | C | D | D | C | C | Comp. |
| 34 | S34 | — | 4FR | DD | E | D | C | D | Comp. |
| 35 | S35 | — | S14 | C | D | D | C | C | Comp. |
| 36 | 8UX-HA | — | 4UY | D | E | D | C | D | Comp. |
| 37 | 8UX-H | — | 4UY | D | E | D | C | D | Comp. |
| 38 | 8UY-HA | — | 4UY | C | D | D | B | C | Comp. |

Comp.: comparative example

The table shows that the polarizing plates and the liquid crystal displays employing the polarizing plate protective film of the present invention are superior in polarizing plate deterioration, dimensional change, corner mottle, and viewing angle variation, compared to the comparative examples.

What is claimed is:

1. A polarizing plate protective film, comprising:
   a cellulose ester film containing polyester which has no aromatic ring in its molecule and exhibits negative birefringence; and
   an actinic radiation cured resin layer serving as a hard coat layer provided on the cellulose ester film;
   wherein the cellulose ester film is stretched by 1.01 times or more in a width direction and exhibits a retardation value Ro, defined by Expression (I), of 0 to 10 nm and a retardation value Rt, defined by Expression (II), of −20 to 20 nm:

$Ro = (nx - ny) \times d$    Expression (I):

$Rt = \{(nx+ny)/2 - nz\} \times d$    Expression (II):

wherein nx is a refractive index in a slow axis direction in a plane of the polarizing plate protective film, ny is a refractive index in a direction orthogonal to the slow axis in the plane, nz is a refractive index in a film thickness direction, and d is a film thickness (nm), and
   wherein a difference value ΔRt defined by Expression (III) is less than 15 nm, $\Delta Rt \text{ (nm)} = Rt(23° C., 80\% RH) - Rt(23° C., 20\% RH)$    Expression (III):

where Rt (23° C., 80% RH) represents a retardation value Rt measured after the polarizing plate protective film was placed under an environment of 23° C. and 80% RH for 10 hours, and Rt (23° C., 20% RH) represents a retardation value Rt measured after the polarizing plate protective film was placed under an environment of 23° C. and 20% RH for 10 hours,
   wherein the polyester is represented by Formula (3) or (4):

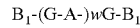    Formula (3):

wherein B1 is a monocarboxylic acid, G is a dihydric alcohol, A is a dibasic acid; $B_1$, G and A each contain no aromatic ring, w is a repetition number and 1 to 70, and a plurality of $B_1$ and G may be the same or different:

    Formula (4):

wherein $B_2$ is a monohydric alcohol, G is a dihydric alcohol, A is a dibasic acid; $B_2$, G, and A each contain no aromatic ring, z is a repetition number and 1 to 70, and a plurality of $B_2$ and G may be the same or different, and
   wherein the polyester represented by Formula (3) or (4) counteracts an increase in each of the retardation values (absolute value) Ro and Rt of the cellulose ester film when the cellulose ester film is stretched.

2. The polarizing plate protective film described in claim 1, wherein the cellulose ester film further contains at least one of Polymer X and Polymer Y which have no aromatic ring in their molecule and exhibits negative birefringence; and
   wherein Polymer X has a weight average molecular weight of 5000-30000, and is obtained via copolymerization of ethylenically unsaturated monomer Xa having neither an aromatic ring nor a hydrophilic group in the molecule, and ethylenically unsaturated monomer Xb having no aromatic ring but having a hydrophilic group in the molecule, and wherein the Polymer X is represented by Formula (1) and Polymer Y is represented by Formula (2):

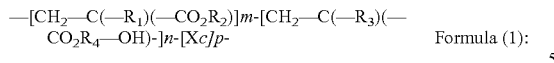

Formula (1):

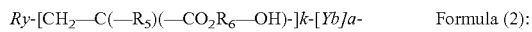

Formula (2):

wherein $R_1$, $R_3$, and $R_5$ are H or $CH_3$, $R_2$ is an alkyl group of a carbon number of 1-12 or a cycloalkyl group, $R_4$ and $R_6$ are $-CH_2-$, $-C_2H_4-$, or $-C_3H_6-$, Ry is OH, H, or an alkyl group of a carbon number of at most 3, Xc is a monomer unit polymerizable with Xa or Xb, Yb is a monomer unit copolymerizable with Ya; and m, n, k, p, and q are molar composition ratios wherein m≠0, n≠0, k≠0, m+n+p=100, and k+q=100.

3. The polarizing plate protective film described in claim 2, wherein Polymer Y has a weight average molecular weight of 500-3000 and is obtained via polymerization of ethylenically unsaturated monomer Ya having no aromatic ring.

4. The polarizing plate protective film described in claim 1, wherein the hard coat layer has a thickness of 1-30 μm.

5. The polarizing plate protective film described in claim 1, wherein the cellulose ester film has a thickness of 15 to 60 μm.

6. The polarizing plate protective film described in claim 1, wherein ΔRt is less than 10.

* * * * *